United States Patent
Nam et al.

(10) Patent No.: US 12,027,140 B2
(45) Date of Patent: Jul. 2, 2024

(54) DISPLAY DEVICE FOR IMAGE QUALITY CONTROL AND METHOD FOR CONTROLLING DISPLAY

(71) Applicant: LG ELECTRONICS INC., Seoul (KR)

(72) Inventors: Yeonoh Nam, Seoul (KR); Sangchurl Nam, Seoul (KR); Chungbin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/931,467

(22) Filed: Sep. 12, 2022

(65) Prior Publication Data

US 2024/0013751 A1   Jan. 11, 2024

(30) Foreign Application Priority Data

Jul. 7, 2022   (KR) ........................ 10-2022-0083867

(51) Int. Cl.
G09G 5/10 (2006.01)

(52) U.S. Cl.
CPC ....... G09G 5/10 (2013.01); *G09G 2320/0242* (2013.01); *G09G 2320/0626* (2013.01); *G09G 2320/066* (2013.01)

(58) Field of Classification Search
CPC ............. G09G 5/10; G09G 2320/0242; G09G 2320/0626; G09G 2320/066; G09G 3/20; G09G 2320/0252; G09G 2340/14; G09G 2360/16; G09G 3/2003; G09G 3/2007; G09G 5/00; G09G 5/005; G09G 5/026;
(Continued)

(56) References Cited

U.S. PATENT DOCUMENTS

| 6,836,288 B1 * | 12/2004 | Lewis | H04N 23/72 |
| | | | 348/297 |
| 9,013,462 B2 * | 4/2015 | Kimoto | G09G 3/003 |
| | | | 345/211 |

(Continued)

FOREIGN PATENT DOCUMENTS

| JP | 2006293328 | 10/2006 |
| JP | 2015225393 | 12/2015 |

(Continued)

OTHER PUBLICATIONS

Korean Intellectual Property Office Application No. 10-2022-0083867, Notice of Allowance dated Aug. 11, 2023, 8 pages.

(Continued)

*Primary Examiner* — Rodney Amadiz
(74) *Attorney, Agent, or Firm* — LEE, HONG, DEGERMAN, KANG & WAIMEY

(57) ABSTRACT

Provided is a display device including a communication device for receiving an input image containing a first frame and a second frame, an image quality controller for performing a first image quality control on at least a portion of the first frame, and a gain generator for calculating a gain of the second frame based on the first frame where the first image quality control has been performed, wherein the image quality controller performs a second image quality control applied with the gain for at least a portion of the second frame.

10 Claims, 15 Drawing Sheets

(58) Field of Classification Search
CPC ... G09G 2320/0238; G09G 2320/0271; G09G 2320/0666; H04N 1/4092; H04N 5/57; G06F 3/147
See application file for complete search history.

(56) References Cited

U.S. PATENT DOCUMENTS

2012/0086713 A1* 4/2012 Cho .................... G09G 3/3648
345/419
2015/0327800 A1* 11/2015 Chen .................. A61B 5/14552
600/479
2018/0151153 A1* 5/2018 Heo .................... H04N 1/6008

FOREIGN PATENT DOCUMENTS

| KR | 100836010 | 6/2008 |
| KR | 1020200079922 | 7/2020 |

OTHER PUBLICATIONS

Korean Intellectual Property Office Application No. 10-2022-0083867, Notice of Allowance dated Nov. 29, 2023, 6 pages.

\* cited by examiner (a)

(b)

(a)

(b)

(a)  (b)

(c)

DISPLAY DEVICE FOR IMAGE QUALITY CONTROL AND METHOD FOR CONTROLLING DISPLAY

CROSS-REFERENCE TO RELATED APPLICATION

Pursuant to 35 U.S.C. § 119(a), this application claims the benefit of earlier filing date and right of priority to Korean Patent Application No. 10-2022-0083867, filed on Jul. 7, 2022, the contents of which are all hereby incorporated by reference herein in its entirety.

BACKGROUND

Field

Embodiments relate to a display device and a display control method. For example, the embodiments are applied to a display device and a display control method capable of performing image quality control of an image.

Discussion of the Related Art

For example, a display device receives an image signal and displays the received image signal. In this regard, the display device converts the image signal to a format suitable for being displayed. The display device controls an image quality of the received image signal to correct the image signal to be in a form suitable for being displayed. For example, the display device adjusts the received image signal to have a resolution suitable for the display device. Alternatively, the display device controls the image quality of the image signal such that the received image signal has appropriate contrast or sharpness.

In this regard, when the image quality control is performed on the image signal, there is a problem that a reverse afterimage phenomenon such as overshoot, undershoot, and the like occurs at an unexpected point. In this case, an image screen is output with a white drag, and accordingly, a viewer is given impression that the screen is not clear or blurry.

Furthermore, when one or more image quality controls are performed on the image signal, there is a problem in that a result different from the expected is output as results of the respective controls are overlapped with each other. In this case, there is a problem that the reverse afterimage phenomena that appear when one image quality control is performed occur at the unexpected point.

Accordingly, there is a need for a display device and/or a control method minimizing the occurrence of the reverse afterimage phenomenon while performing the one or more image quality controls on the image signal.

SUMMARY

Embodiments are to provide a display device and a display control method for solving the above-described problems.

Embodiments are to provide a display device and a display control method for performing image quality control.

Embodiments are to provide a display device and a display control method for performing two or more image quality controls.

Embodiments are to provide a display device and a display control method in which side effects such as undershoot, overshoot, and ringing are minimized even when one or more image quality controls are performed.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to embodiments, provided is a display device including a communication device for receiving an input image containing a first frame and a second frame, wherein the second frame follows the first frame in time, an image quality controller that performs a first image quality control on at least a portion of the first frame, and a gain generator that calculates a gain of the second frame based on the first frame where the first image quality control has been performed, wherein the image quality controller performs a second image quality control applied with the gain for at least a portion of the second frame.

According to embodiments, each of the first image quality control and the second image quality control includes a sharpness control and a contrast control.

According to embodiments, the image quality controller performs the second image quality control including the sharpness control and the contrast control calculated based on a transfer function.

According to embodiments, the gain generator calculates the gain in a direction of suppressing the sharpness control when a differential value of a contrast transfer function with respect to the contrast control exceeds a preset value, calculates the gain in a direction of preserving the sharpness control when the differential value of the contrast transfer function is the preset value, and calculates the gain in a direction of increasing the sharpness control when the differential value of the contrast transfer function is equal to or lower than the preset value.

According to embodiments, the image quality controller performs the second image quality control based on $U(x)=x+x*h\times g$ and $U(x)$ is the second frame where the second image quality control has been performed, $x$ is the second frame, $h$ is an image quality control filter, and $g$ is the gain.

According to embodiments, the image quality controller detects average brightness of the input image and performs the image quality control based on the average brightness.

According to embodiments, the input image further contains a third frame following the second frame in time, the image quality controller performs the image quality control by applying a first gain to the second frame and performs the image quality control by applying a second gain to the third frame when the calculated gain is out of a preset range, and the gain gradually comes out of the preset range from the first gain to the second gain.

According to embodiments, the image quality controller performs the image quality control for each pixel contained in the first frame.

According to embodiments, the display device includes gain generators of the number corresponding to the number of one or more pixels contained in the first frame.

According to embodiments, the gain as a value applicable to the image quality control is a value for at least one of contrast, brightness, color depth, and resolution.

According to embodiments, a method for controlling a display includes receiving, by a communication device, an input image, calculating, by a gain generator, a gain for at least a portion of the input image, performing, by an image quality controller, an image quality control on the input image by applying the gain, and outputting, by a display, the input image where the image quality control has been performed.

According to embodiments, the input image contains a first frame and a second frame following the first frame in time, and the calculating of the gain includes performing a first image quality control on at least a portion of the first frame, calculating the gain based on the first frame where the first image quality control has been performed, and performing a second image quality control on at least a portion of the second frame by applying the gain.

According to embodiments, each of the first image quality control and the second image quality control includes a sharpness control and a contrast control.

According to embodiments, the calculating of the gain includes calculating the gain such that the sharpness control is suppressed when a contrast control effect based on the contrast control is greater than a preset value for the at least a portion of the first frame, calculating the gain such that the sharpness control is preserved when the contrast control effect based on the contrast control is the preset value for the at least a portion of the first frame, and calculating the gain such that the sharpness control is increased when the contrast control effect based on the contrast control is smaller than the preset value for the at least a portion of the first frame.

According to embodiments, the input image further contains a third frame following the second frame in time, the performing of the second image quality control includes, when the gain calculated based on the first frame is out of a preset range, performing the image quality control by applying a first gain to the second frame, and performing the image quality control by applying a second gain to the third frame, and the gain gradually comes out of the preset range from the first gain to the second gain.

The display device and the display control method according to the embodiments may perform the image quality control on the input image.

The display device and the display control method according to the embodiments may minimize the side effects while performing the image quality control on the input image.

The display device and the display control method according to the embodiments may minimize the image quality degradation caused by the occurrence of the overshoot, the undershoot, the ringing, the ripple artifacts, and the like occurring in the output image.

It will be appreciated by persons skilled in the art that that the effects that can be achieved through the embodiments of the present disclosure are not limited to those described above and other advantageous effects of the present disclosure will be more clearly understood from the following detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Figure 1:
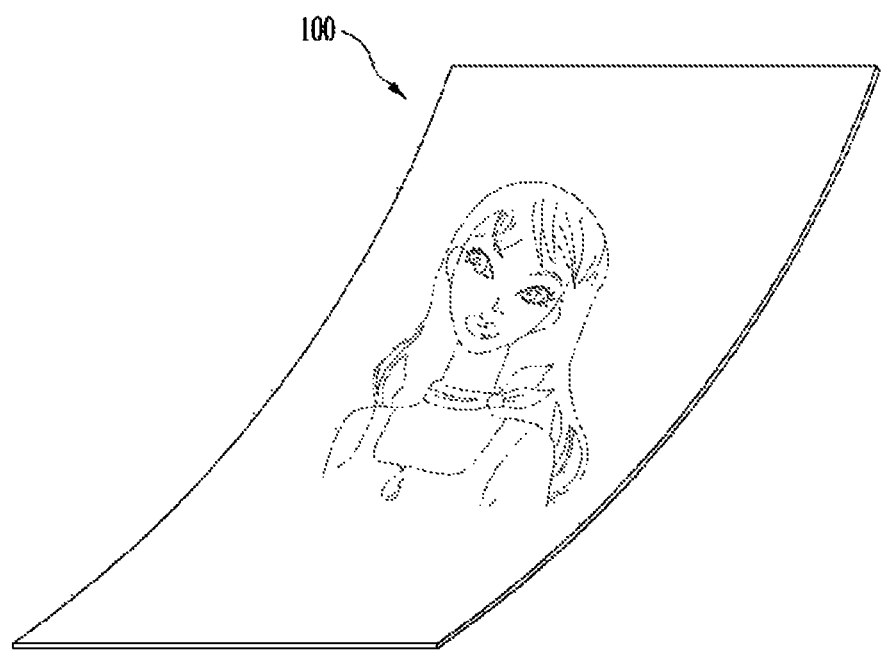
FIG. 1 is a conceptual view illustrating an embodiment of a display device according to embodiments.

Reference will now be made in detail to embodiments of the present disclosure, examples of which are illustrated in the accompanying drawings. Wherever possible, the same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions.

Further, in describing the embodiments disclosed in this specification, if a detailed description of related known techniques would unnecessarily obscure the gist of the embodiments disclosed in this specification, detailed description thereof will be omitted. In addition, the attached drawings are provided for easy understanding of the embodiments disclosed in this specification and do not limit technical idea disclosed in this specification, and the embodiments should be construed as including all modifications, equivalents, and alternatives falling within the spirit and scope of the present disclosure.

Terms including ordinal numbers such as first, second, etc. may be used to explain various elements. However, it will be appreciated that the elements are not limited to such terms. These terms are merely used to distinguish one element from another. Stating that one constituent is "connected" or "linked" to another constituent should be understood as meaning that the one constituent may be directly connected or linked to the other constituent or another constituent may be interposed between the constituents.

On the other hand, stating that one constituent is "directly connected" or "directly linked" to another should be understood as meaning that no other constituent is interposed between the constituents. As used herein, the singular forms "a", "an", and "the" include plural referents unless context clearly dictates otherwise. In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

The display device described herein is a concept including all display devices that display information with a unit pixel or a set of unit pixels. Therefore, the display device may be applied not only to finished products but also to parts. For example, a panel corresponding to a part of a digital TV also independently corresponds to the display device in the present specification. The finished products include a mobile phone, a smartphone, a laptop, a digital broadcasting terminal, a personal digital assistant (PDA), a portable multimedia player (PMP), a navigation system, a slate PC, a tablet, an Ultrabook, a digital TV, a desktop computer, and the like.

However, it will be readily apparent to those skilled in the art that the configuration according to the embodiments described herein is applicable even to a new product that will be developed later as a display device.

Contrast as described herein is a difference in a degree of brightness revealed between a bright area and a dark area. For example, when the contrast is large, the difference between the bright and dark areas is large, so that it is easy to distinguish between the bright and dark areas. Sharpness as described herein is a degree of clearness or relief. For example, the sharpness is a degree to which a boundary between a first position and a second position is clear. Resolution described herein is a degree of precision of an image. Gradation as described herein is a step of concentration.

Contrast control as described herein is control of the contrast with respect to an input image, and includes, for example, contrast enhancement. In addition, sharpness control as described herein is control of the sharpness with respect to the input image, and includes, for example, sharpness enhancement.

FIG. 1 is a conceptual view illustrating an embodiment of a display device according to embodiments.

As shown in FIG. 1, information processed by a controller (180, see FIG. 7) of a display device 1000 may be displayed using a flexible display.

The flexible display may include, for example, a display that can be warped, bent, twisted, folded, or rolled by external force.

Furthermore, the flexible display may be, for example, a display manufactured on a thin and flexible substrate that can be warped, bent, folded, or rolled like paper while maintaining the display characteristics of a conventional flat panel display.

When the flexible display remains in an unbent state (e.g., a state having an infinite radius of curvature) (hereinafter referred to as a first state), the display area of the flexible display forms a flat surface. When the display in the first state is changed to a bent state (e.g., a state having a finite radius of curvature) (hereinafter referred to as a second state) by external force, the display area may be a curved surface. As shown in FIG. 1, the information displayed in the second state may be visual information output on a curved surface. Such visual information may be implemented by independently controlling the light emission of sub-pixels arranged in a matrix form. The unit pixel may mean, for example, a minimum unit for implementing one color.

The unit pixel of the flexible display may be implemented by a semiconductor light emitting element. In the present disclosure, a light emitting diode (LED) is exemplified as a type of the semiconductor light emitting element configured to convert electric current into light. The LED may be formed in a small size, and may thus serve as a unit pixel even in the second state.

Hereinafter, a content on output of an image by the display device 1000 will be described in detail.

Figure 2:
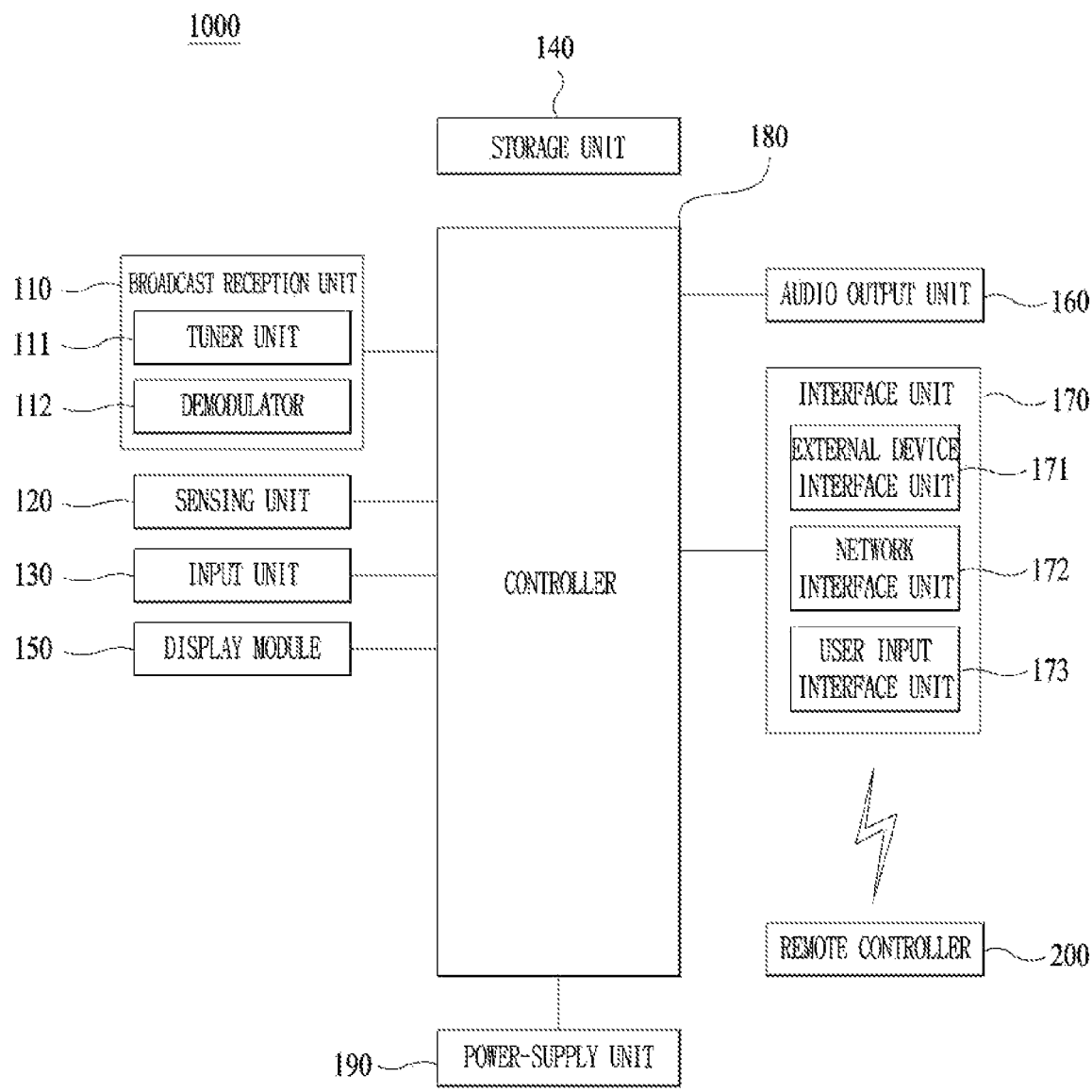
FIG. 2 is a block diagram illustrating constituent elements of a display device according to an embodiment of the present disclosure.

FIG. 2 is a block diagram illustrating constituent elements of a display device according to an embodiment of the present disclosure.

Referring to FIG. 2, the display device 1000 may include a broadcast reception unit 110, an external device interface unit 171, a network interface unit 172, a storage unit 140, a user input interface unit 173, an input unit 130, a controller 180, a display module 150, an audio output unit 160, and/or a power-supply unit 190.

The broadcast reception unit 110 may include a tuner unit 111 and a demodulator 112.

Although not shown in the drawings, the display device 1000 may include only the external device interface unit 171 and the network interface unit 172 from among the broadcast reception unit 110, the external device interface unit 171, and the network interface unit 172. That is, the display device 1000 may not include the broadcast reception unit 110.

The tuner unit 111 may select a broadcast signal corresponding to either a user-selected channel or all prestored channels from among broadcast signals received through an antenna (not shown) or a cable (not shown). The tuner unit 111 may convert the selected broadcast signal into an intermediate frequency (IF) signal or a baseband image or a voice signal.

For example, when the selected broadcast signal is a digital broadcast signal, the tuner unit 111 may convert the selected broadcast signal into a digital IF (DIF) signal. When the selected broadcast signal is an analog broadcast signal, the tuner unit 111 may convert the selected broadcast signal into an analog baseband image or a voice signal (CVBS/SIF). That is, the tuner unit 111 may process the digital broadcast signal or the analog broadcast signal. The analog baseband image or the voice signal (CVBS/SIF) output from the tuner unit 111 may be directly input to the controller 180.

The tuner unit 111 may sequentially select broadcasting signals of all broadcasting channels stored through a channel memory function from among the received broadcast signals, and may convert the selected broadcast signal into an intermediate frequency (IF) signal or a baseband image or a voice signal.

The tuner unit 111 may include a plurality of tuners to receive broadcast signals of the plurality of channels. Alternatively, a single tuner for simultaneously receiving broadcast signals of the plurality of channels is also possible.

The demodulator 112 may receive the digital IF signal (DIF) converted by the tuner unit 111, and may thus perform demodulation of the received signal. The demodulator 112 may perform demodulation and channel decoding, and may output a stream signal (TS). The stream signal may be a signal formed by multiplexing an image signal, a voice signal, or a data signal.

The stream signal (TS) output from the demodulator 112 may be input to the controller 180. The controller 180 may perform demultiplexing, image/audio signal processing, etc., may output an image through the display module 150, and may output a voice through the audio output unit 160.

The sensing unit 120 may sense a change in the display device 1000 or may sense an external change. For example, the sensing unit 120 may include a proximity sensor, an illumination sensor, a touch sensor, an infrared (IR) sensor, an ultrasonic sensor, an optical sensor (e.g., a camera), a voice sensor (e.g., a microphone), a battery gauge, environmental sensors (e.g., hygrometer, a thermometer, etc.).

The controller 180 may check a state of the display device 1000 based on information collected by the sensing unit 120, may notify the user of a problem, or may control the display device 1000 to be kept in the best state.

In addition, it is possible to provide an optimal viewing environment by differently controlling the content, image quality, size, etc. of the image provided to the display module 180 depending on the viewer, ambient illuminance, etc. sensed by the sensing unit. As the smart TV has evolved, the number of functions mounted in the display device increases, and the number of the sensing units 20 also increases together with the increasing functions.

The input unit 130 may be provided at one side of a main body of the display device 1000. For example, the input unit 130 may include a touch pad, a physical button, and the like. The input unit 130 may receive various user commands related to the operation of the display device 1000, and may transmit a control signal corresponding to the input command to the controller 180.

Recently, as a bezel of the display device 1000 decreases in size, the number of display devices 100 each including a minimum number of input unit 130 formed in a physical button exposed to the outside is rapidly increasing. Instead, a minimum number of physical buttons may be provided on the back or side surface of the display device 1000. The display device may receive a user input through the remote controller 200 through a touchpad or a user input interface unit 173 to be described later.

The storage unit 140 may store a program for processing and controlling each signal used in the controller 180, and may store a signal-processed image, a voice, or a data signal. For example, the storage unit 140 may store application programs designed for the purpose of performing various tasks that can be processed by the controller 180, and may selectively provide some of the stored application programs upon request of the controller 180.

The program stored in the storage unit 140 is not specifically limited to being executed by the controller 180. The storage unit 140 may perform a function for temporarily storing an image, a voice, or a data signal received from an external device through the external device interface unit 171. The storage unit 140 may store information about a predetermined broadcast channel through a channel memory function such as a channel map.

Although the storage unit 140 of FIG. 2 is provided separately from the controller 180, the scope of the present disclosure is not limited thereto, and the storage unit 140 may also be included in the controller 180 as needed.

The storage unit 140 may include at least one of a volatile memory (e.g., DRAM, SRAM, SDRAM, etc.) and a nonvolatile memory (e.g., flash memory, hard disk drive (HDD), solid state drive (SSD), etc.).

The display module 150 may generate a drive signal by converting an image signal, a data signal, an OSD signal, a control signal processed by the controller 180, or by converting an image signal, a data signal, a control signal, etc. received from the interface unit 171. The display module 150 may include a display panel 181 having a plurality of pixels.

A plurality of pixels included in the display panel may include RGB sub-pixels. Alternatively, a plurality of pixels included in the display panel may include sub-pixels of RGBW. The display module 150 may convert the image signal, the data signal, the OSD signal, the control signal, etc. processed by the controller 180 to generate a drive signal for the plurality of pixels.

The display module 150 may be implemented as a plasma display panel (PDP), a liquid crystal display (LCD), an organic light emitting diode (OLED), a flexible display, etc. In addition, the display module 150 may also be implemented as a three-dimensional (3D) display. The three-dimensional (3D) display module 150 may be classified into a glassless-type 3D display and a glasses-type 3D display.

Recently, the display device 1000 has evolved from a flat-screen display to a curved-screen display. In order to implement the curved screen, the display device 1000 may use a display module 150 that can be bent or curved, such as a light emitting diode (LED) or an organic light emitting diode (OLED), etc.

Conventionally, the LCD has difficulty in self-emitting light, so that the conventional LCD has been designed to receive light through a backlight unit. The backlight unit is a device for uniformly supplying light received from a light source to a liquid crystal located on the front surface of the display device. As the backlight becomes thinner, a thin LCD can be implemented. However, it is actually difficult for the backlight unit to be implemented as a curved structure formed of a flexible material. Although the backlight unit is implemented as a curved shape, it is difficult for light to be uniformly applied to the liquid crystal, thereby changing brightness of the screen.

On the other hand, the LED or the OLED is designed in a manner that each of constituent elements constructing the pixels can self-emit light without using the backlight unit, so that the LED or the OLED can be implemented as a curved shape without any problems. In addition, since each element can perform self-emission of light, brightness of each element is not affected by a change in the positional relationship between the element and adjacent elements, so that a curved display module 150 can be implemented as an LED or OLED.

OLED (Organic Light Emitting Diode) panels appeared in earnest in mid-2010 and are rapidly replacing LCDs in the small- and medium-sized display market. The OLED is a display made using the self-emission characteristics in which OLED emits light when a current flows in a fluorescent organic compound. Since the response speed of the OLED is faster than that of the LCD, there is little afterimage when moving images are implemented.

OLEDs may be used as a light-emitting display product. In this case, the light-emitting display device may use three fluorescent organic compounds (such as red, green, and blue) each having a self-emitting function, and may use the self-emitting phenomenon in which positive(+)-charged particles and electrons injected from a cathode and anode are combined with each other within the organic material, so that a backlight unit causing degradation of color sense need not be used.

The LED panel is implemented by technology for using only one LED element as one pixel, and has a smaller LED element compared to the prior art, so that a curved display module 150 can be implemented. Whereas the conventional device referred to as an LED TV can use the LED as a light source of the backlight unit for supplying light to the LCD, it is impossible for the LED of the conventional device to constitute a screen.

The display module may include a display panel, a coupling magnet located on the rear surface of the display panel, a first power-supply unit, and a first signal module. The display panel may include a plurality of pixels (R, G, B). The plurality of pixels (R, G, B) may be formed in each region where a plurality of data lines and a plurality of gate lines cross each other. The plurality of pixels (R, G, B) may be arranged in a matrix.

For example, the plurality of pixels (R, G, B) may include a red (R) sub-pixel, a green (G) sub-pixel, and a blue (B) sub-pixel. The plurality of pixels (R, G, B) may further include white (W) sub-pixel(s).

In the display module 150, one side where an image is displayed may be referred to as a front side or a front surface. When the display module 150 displays an image, one side where no image is observed may be referred to as a rear side or a rear surface.

Meanwhile, the display module 150 may be implemented as a touchscreen, so that the display module 150 can also be used as an input device in addition to an output device.

The audio output unit 160 may receive a voice-processed signal from the controller 180, and may output the received signal as a voice signal.

The interface unit 170 may serve as a path of connection to various kinds of external devices connected to the display device 1000. The interface unit may include not only a wired method for transmitting/receiving data through a cable, but also a wireless method using the antenna.

The interface unit 170 may include at least one of a wired/wireless headset port, an external charger port, a wired/wireless data port, a memory card port, a port connected to a device having an identification module, an audio input/output (I/O) port, a video I/O port, and an earphone port.

As an example of a wireless method, the above-described broadcast reception unit 110 may be used. The broadcast reception unit 110 may be configured to use a broadcast signal, a mobile communication short-range communication signal, a wireless Internet signal, and the like.

The external device interface unit 171 may transmit or receive data to and from a connected external device. To this end, the external device interface unit 171 may include an A/V input/output (I/O) unit (not shown).

The external device interface unit 171 may be wired or wirelessly connected to an external device such as a digital versatile disc (DVD) player, a Blu-ray player, a game console, a camera, a camcorder, a computer (laptop), a set-top box, or the like, and may perform an input/output (I/O) operation with the external device.

In addition, the external device interface unit 171 may establish a communication network with various remote controllers 200, may receive a control signal related to operation of the display device 1000 from the remote controller 200, or may transmit data related to operation of the display device 1000 to the remote controller 200.

The external device interface unit 171 may include a wireless communication unit (not shown) for short-range wireless communication with other electronic devices. Through the wireless communication unit (not shown), the external device interface unit 171 may exchange data with an adjacent mobile terminal. In particular, the external device interface unit 171 may receive device information, application information, an application image, and the like from the mobile terminal in a mirroring mode.

The network interface unit 172 may provide an interface for connecting the display device 1000 to a wired/wireless network including the Internet network. For example, the network interface unit 172 may receive content or data provided by the Internet, a content provider, or a network administrator through a network. The network interface unit 172 may include a communication module (not shown) for connection with the wired/wireless network.

The external device interface unit 171 and/or the network interface unit 172 may include a communication module for short-range communication such as Wi-Fi, Bluetooth, Bluetooth low energy (BLE), ZigBee, Near Field Communication (NFC), and a communication module for cellular communication such as Long-Term Evolution (LTE), LTE-A (LTE Advanced), Code Division Multiple Access (CDMA), WCDMA (wideband CDMA), UMTS (universal mobile telecommunications system), WiBro (Wireless Broadband), etc.

The user input interface unit 173 may transmit user input signals to the controller 180, or may transmit signals received from the controller 180 to the user. For example, the user input interface unit 173 may transmit or receive user input signals (such as a power-on/off signal, a channel selection signal, and a screen setting signal) to and from the remote controller 200, may transmit user input signals received through a local key (not shown) such as a power key, a channel key, a volume key, and a setting key to the controller 180, may transmit a user input signal received by a sensor unit (not shown) for sensing a user gesture to the controller 180, or may transmit a signal received from the controller 180 to the sensor unit.

The controller 180 may include at least one processor, and may control the overall operation of the display device 1000 using the processor included therein. Here, the processor may be a general processor such as a CPU. Of course, the processor may be a dedicated device such as an ASIC, or other hardware-based processor.

The controller 180 may demultiplex the stream received through the tuner unit 111, the demodulator 112, the external device interface unit 171, or the network interface 172, and may process the demultiplexed signals to generate and output a signal for image or voice output.

The image signal processed by the controller 180 may be input to the display module 150 and displayed as an image corresponding to the corresponding image signal. In addition, the image signal processed by the controller 180 may be input to the external output device through the external device interface unit 171.

The voice (or audio) signal processed by the controller 180 may be audibly output to the audio output unit 160. In addition, the voice signal processed by the controller 180 may be input to the external output device through the external device interface unit 171. Although not shown in FIG. 2, the controller 180 may include a demultiplexer, an image processor, and the like, and a detailed description thereof will hereinafter be described with reference to FIG. 3.

In addition, the controller 180 may control the overall operation of the display device 1000. For example, the controller 180 may control the tuner unit 111 to select a broadcast program corresponding to either a user-selected channel or a prestored channel.

In addition, the controller 180 may control the display device 1000 by a user command or an internal program received through the user input interface unit 173. The controller 180 may control the display module 150 to display an image. In this case, the image displayed on the display module 150 may be a still image or a moving image, and may be a 2D image or a 3D image.

On the other hand, the controller 180 may display a predetermined 2D object in the image displayed on the display module 150. For example, the object may be at least one of a connected web screen (newspaper, magazine, etc.), electronic program guide (EPG), various menus, widgets, icons, still images, moving images, and text.

Meanwhile, the controller 180 may modulate and/or demodulate the signal using an amplitude shift keying (ASK) scheme. Here, the ASK scheme may refer to a method for modulating a signal by differentiating the amplitude of a carrier wave according to data values or for restoring an analog signal to a digital data value according to the amplitude of the carrier wave.

For example, the controller 180 may modulate an image signal using the ASK scheme, and may transmit the modulated signal through a wireless communication module.

For example, the controller 180 may demodulate and process the image signal received through the wireless communication module using the ASK scheme.

Accordingly, the display device 1000 may simply transmit and receive signals to and from other image display devices arranged adjacent to each other without using either a unique identifier such as a Media Access Control (MAC) address or a complex communication protocol such as TCP/IP.

On the other hand, the display device 1000 may further include a photographing unit (not shown). The photographing unit may photograph a user. The photographing unit may be implemented as one camera, but is not limited thereto, and may be implemented by a plurality of cameras. On the other hand, the photographing unit may be embedded in the display device 1000 or may be separately arranged on the display module 150. The image information photographed by the photographing unit may be input to the controller 180.

The controller 180 may recognize the position of the user based on the image photographed by the photographing unit. For example, the controller 180 may recognize a distance (z-axis coordinates) between the user and the display device 1000. In addition, the controller 180 may recognize the X-axis coordinate and the Y-axis coordinate within the display module 150 corresponding to the user position.

The controller 180 may sense a user gesture based on an image photographed by the photographing unit, each of signals detected by the sensor unit, or a combination thereof.

The power-supply unit 190 may supply corresponding power to the display device 1000. In particular, the controller 180 may be implemented as a System on Chip (SoC), a display module 150 for displaying an image, and an audio output unit 160 for audio output.

Specifically, the power-supply unit 190 may include a converter (not shown) for converting AC power into DC power, and a DC/DC converter (not shown) for converting the level of DC power.

On the other hand, the power-supply unit 190 may receive power from the external power source, and may distribute the received power to the respective components. The power-supply unit 190 may be directly connected to the external power source to supply AC power, and may include a battery capable of being charged with electricity.

In the former case, the power-supply unit 190 may be used by connecting to a wired cable, and it is difficult for the power-supply unit 190 to move from one place to another place, and the movement range of the power-supply unit 190 is limited. In the latter case, the power-supply unit 190 can move from one place to another place, but the weight and volume of the power-supply unit 190 may increase as much as the weight and volume of the battery. In addition, for charging, the power-supply unit 190 should be directly connected to a power cable for a predetermined period of time or should be coupled to a charging cradle (not shown) for power supply.

The charging cradle may be connected to the display device through a terminal exposed to the outside. Alternatively, if the power-supply unit 190 approaches the charging cradle using a wireless interface, a built-in battery of the power-supply unit 190 may also be charged with electricity.

The remote controller 200 may transmit a user input to the user input interface unit 173. To this end, the remote controller 200 may use Bluetooth, Radio Frequency (RF) communication, infrared (IR) communication, Ultra-Wideband (UWB), ZigBee, or the like. In addition, the remote controller 200 may receive the image, voice, or data signal output from the user input interface unit 173, and may display or audibly output the received image, voice, or data signal.

On the other hand, the above-described display device 1000 may be a fixed or mobile digital broadcast receiver capable of receiving digital broadcast signals.

Meanwhile, the block diagram of the display device 1000 shown in FIG. 2 is disclosed for only for illustrative purposes for one embodiment of the present disclosure, and the respective components of the display device 1000 shown in FIG. 2 can be integrated, added or omitted according to the specifications of the digital device 100 which is actually implemented.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

Hereinafter, image quality control of an image output via the display device 1000 will be described in detail.

Figure 3:
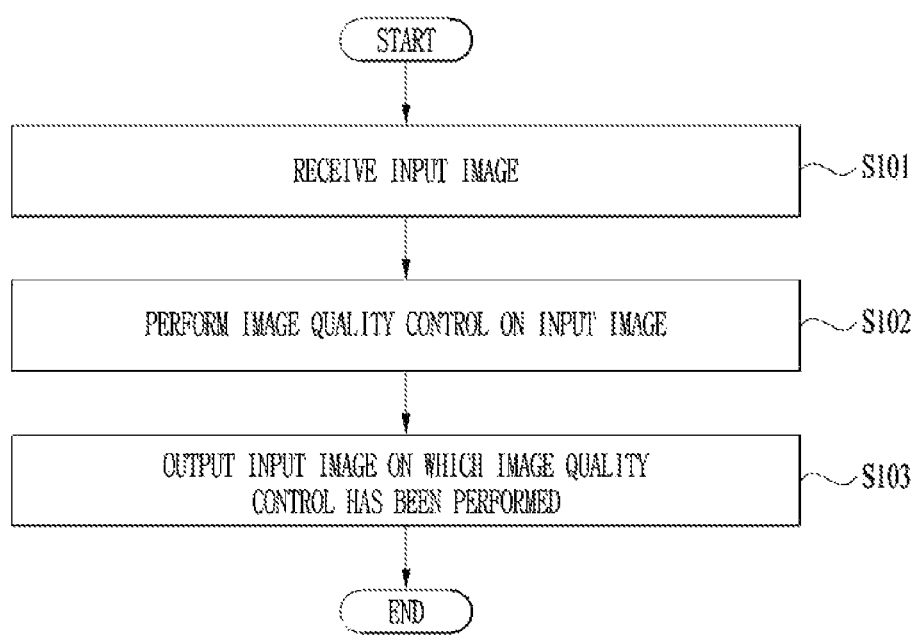
FIG. 3 is a flowchart illustrating a method for controlling a display device according to embodiments.

FIG. 3 is a flowchart illustrating a method for controlling a display device according to embodiments.

As shown in FIG. 3, the method for controlling the display device 1000 includes receiving the input image (s101).

The display device 1000 receives the input image via the broadcast reception unit 110. Alternatively, the display device 1000 may call the input image stored in a memory (not shown). Alternatively, the display device 1000 may acquire the input image via, for example, an input device (not shown) such as a camera.

In this regard, the input image includes an image signal containing image data. The input image includes images of various resolutions. For example, the input image includes an image with resolution such as HD (High Resolution), FHD (Full HD), QHD (Quad HD), WQHD (Wide QHD), UHD (Ultra HD, 4K, 8K, 16K, and the like), and the like. Alternatively, the input image includes various types of compressed images. For example, the input image includes formats compressed to MPEG (MPEG 1, 2, 3, 4, 7, 21, and the like), WMV/WMA, MOV, DivX, Xvid, H.26x, H.120, H.262, H.263, H.264, H.265, and the like.

The input image contains a plurality of frames. For example, the input image contains a first frame (e.g., 11 described in FIG. 12) and a second frame (e.g., 12 described in FIG. 12). In this regard, the second frame follows the first frame in time. That is, when outputting the input image, the display device 1000 outputs the first frame and then outputs the second frame.

As shown in FIG. 3, the method for controlling the display device 1000 includes performing one or more image quality controls on the input image (s102).

The display device 1000 performs the image quality control for each of the plurality of frames. For each of the plurality of frames, the display device 1000 performs the image quality control on at least a portion of each frame. The display device 1000 performs the one or more image quality controls on the input image. In this regard, the image quality control includes the contrast control, the sharpness control, luminance control, color control, and the like. Accordingly, the display device 1000 may perform two or more image quality controls on the input image and, for example, may perform the contrast control and the sharpness control together.

As shown in FIG. 3, the method for controlling the display device 1000 includes outputting the input image on which the image quality control has been performed (s103).

The display device 1000 outputs the input image on which the image quality control has been performed via the display module 150. Alternatively, the display device 1000 outputs the input image on which the image quality control has been performed via an external device connected to the display device 1000 in a wired or wireless manner. In this regard, the display device sequentially outputs the plurality of frames contained in the input image, so that the plurality of frames are output by a time period.

Hereinafter, an example in which the image quality control described in s102 is performed will be described.

Figure 4:
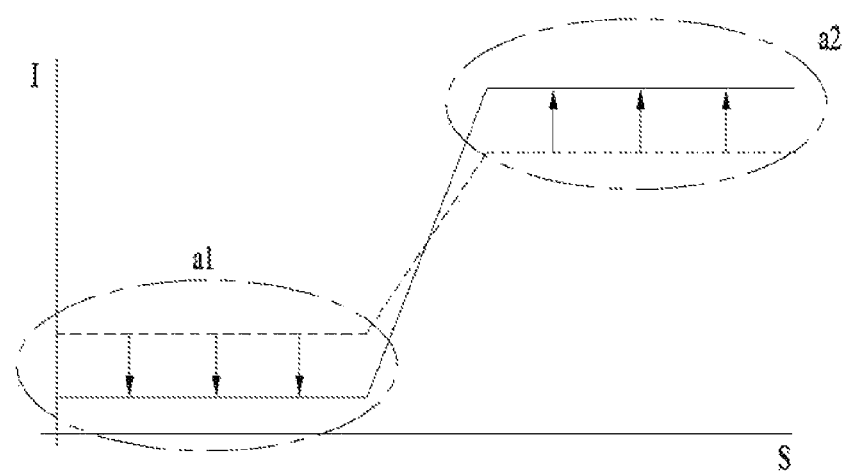
FIG. 4 is a graph illustrating an example of independently controlling contrast and sharpness.
Figure 4:
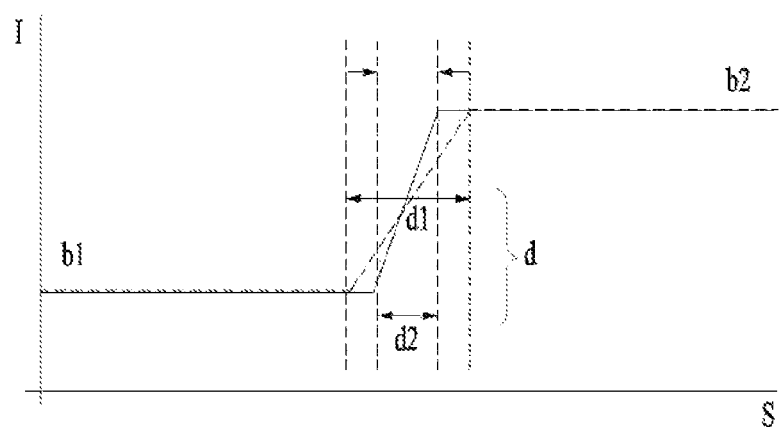

FIG. 4 is a graph illustrating an example of independently controlling contrast and sharpness.

In FIG. 4, a horizontal axis represents a position S at which the image is output via the display module 150, and a vertical axis represents a pixel intensity I as the brightness of the display module. In this regard, the pixel intensity refers to a signal brightness value of the image output via the display. In FIG. 4, a dotted line indicates brightness when the image quality control is not performed on the input image, and a solid line indicates brightness when the image quality control is performed on the input image.

(a) in FIG. 4 is a graph in which the contrast control is performed on the input image. In (a) in FIG. 4, a1 denotes an area having a relatively low pixel intensity, and a2 denotes an area having a relatively high pixel intensity.

The display device 1000 performs, for example, the contrast control on the input image. The display device 1000 outputs an image having the same pixel intensity as the solid line in (a) in FIG. 4 via the display module 150.

For example, in an input image on which the image quality control has not been performed, a difference between the area a having the low pixel intensity and the area a2 having the high pixel intensity is relatively small. In this case, the display device 1000 outputs an image in which the contrast is relatively unclear.

On the other hand, the display device 1000 may output an image with the clear contrast by performing the contrast control on the input image. For example, the display device 1000 makes a relatively dark portion darker as shown in a1 via the contrast control for the input image. In addition, the display device 1000 makes a relatively bright portion brighter as shown in a2 via the contrast control on the input image. That is, the display device 1000 may maximize the contrast of the input image via the contrast control.

(b) in FIG. 4 is a graph in which the sharpness control is performed on the input image. In (b) in FIG. 4, b1 denotes an area having a relatively low pixel intensity, and b2 denotes an area having a relatively high pixel intensity. In addition, in (b) in FIG. 4, d denotes a spacing between the area b1 having the low pixel intensity and the area b2 having the high pixel intensity.

The display device 1000 performs, for example, the sharpness control on the input image. The display device 1000 outputs an image having the same pixel intensity as the solid line in (b) in FIG. 4 via the display module 150.

For example, the input image on which the image quality control has not been performed has a relatively wide spacing d1 between the area b1 with the low pixel intensity and the area b2 with the high pixel intensity. In this case, the display device 1000 outputs an image that is not relatively clear. However, the input image on which the image quality control has been performed has a relatively narrow spacing d2 between the area b1 with the low pixel intensity and the area b2 with the high pixel intensity. That is, the input image on which the image quality control has been performed has a short transition section from the area b1 having the low pixel intensity to the area b2 having the high pixel intensity. As such, the display device 1000 outputs a sharper image by performing the sharpness control on the input image.

As such, the display device 1000 may improve an image quality of an output image by performing the image quality control, such as the contrast control and the sharpness control, on the input image.

Figure 5:
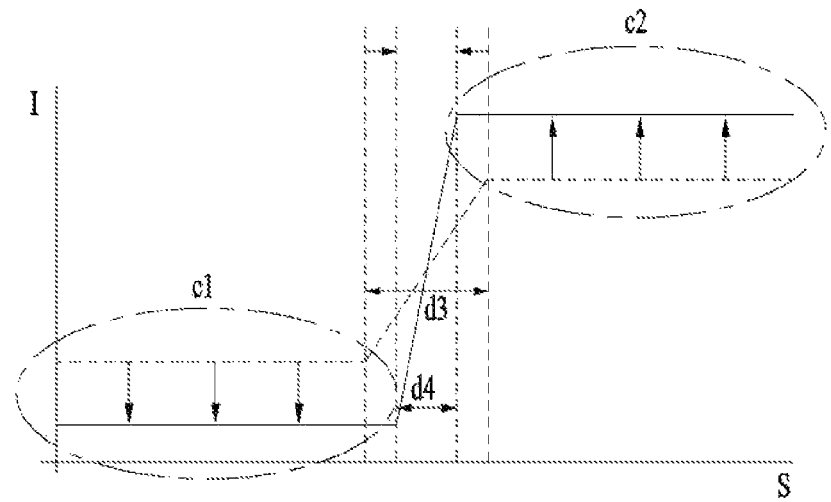
FIG. 5 is a graph illustrating an example of controlling contrast and sharpness together.

FIG. 5 is a graph illustrating an example of controlling contrast and sharpness together.

In FIG. 5, a horizontal axis represents the position S at which the image is output via the display module 150, and a vertical axis represents the pixel intensity I as the brightness of the display module. In addition, in FIG. 5, a dotted line indicates brightness when the image quality control is not performed on the input image, and a solid line indicates brightness when the image quality control is performed on the input image.

FIG. 5 is a graph illustrating an example in which the contrast control described in (a) in FIG. 4 and the sharpness control described in (b) in FIG. 4 are simultaneously performed. In FIG. 5, c1 denotes an area having a relatively low pixel intensity, and c2 denotes an area having a relatively high pixel intensity. In addition, in FIG. 5, d denotes a spacing between the area c1 having the low pixel intensity and the area c2 having the high pixel intensity.

The display device 1000 may perform a plurality of image quality controls on the input image. For example, the display device 1000 sequentially, inversely, or simultaneously performs the contrast control and the sharpness control on the input image. Hereinafter, it will be described that the contrast control and the sharpness control are simultaneously performed for convenience. The display device 1000 outputs an image having the same pixel intensity as the solid line in FIG. 5 via the display module 150.

For example, the display device 1000 makes a relatively dark portion darker as shown in c1 via the contrast control on the input image. In addition, the display device 1000 makes a relatively bright portion brighter as shown in c2 via the contrast control on the input image. In addition, the display device 1000 makes a spacing between the area c1 having the low pixel intensity and the area c2 having the high pixel intensity relatively narrow (d3 d4) via the sharpness control on the input image.

As such, the display device 1000 may perform the two or more image quality controls on the input image to output an image having all of the two or more image quality control effects. For example, the display device 1000 may output an image with high contrast and higher sharpness.

However, the display device 1000 may output a result different from that of each image quality control described with reference to FIG. 4 by performing the two or more image quality controls. For example, the display device 1000 may obtain a sharpness enhancement effect greater or smaller than expected by simultaneously performing the contrast enhancement and the sharpness enhancement. That is, a spacing d4 in the case in which the two image quality controls are simultaneously performed may be smaller than the spacing d2 in the case in which only the sharpness enhancement control is performed.

As described above, when the two or more image quality controls are performed, an image having a transition section from the area c1 having the low pixel intensity to the area c2 having the high pixel intensity is shorter than expected. Accordingly, as the two or more image quality controls are performed, an image different from a desired result may rather be output.

The examples described with reference to FIGS. 4 to 5 illustrate a case in which the image on which the image quality control has been performed is ideally output and the problem resulted therefrom. On the other hand, when the image on which the image quality control has been performed is actually output (for example, when a high-pass filter for performing the image quality control is applied), other effects or problems may occur in addition to the matters described with reference to FIGS. 4 to 5. Hereinafter, as an example different from those in FIGS. 4 to 5, a case in which one or more image quality controls are performed on the input image will be described.

Figure 6:
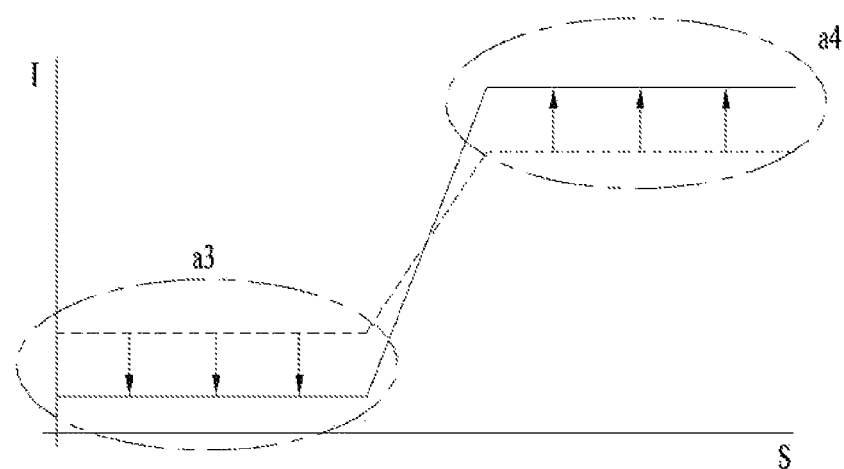
FIG. 6 is a graph illustrating an example of independently controlling contrast and sharpness.
Figure 6:
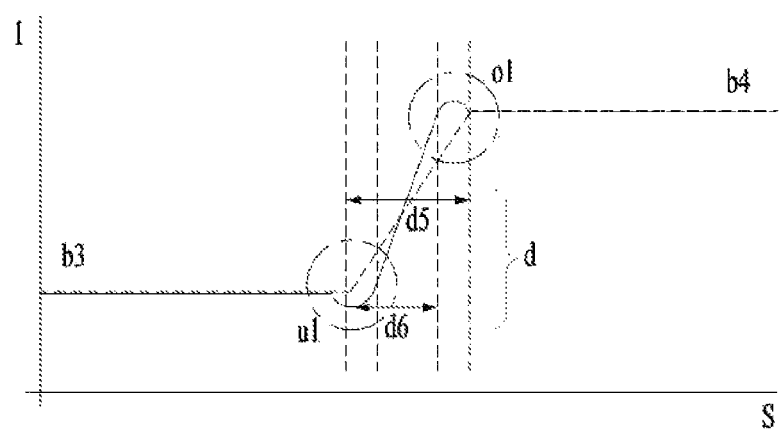

FIG. 6 is a graph illustrating an example of independently controlling contrast and sharpness.

In FIG. 6, a horizontal axis represents the position S at which the image is output via the display module 150, and a vertical axis represents the pixel intensity I as the brightness of the display module. In addition, in FIG. 6, a dotted line indicates brightness when the image quality control is not performed on the input image, and a solid line indicates brightness when the image quality control is performed on the input image.

(a) in FIG. 6 is a graph in which only the contrast control is performed on the input image. In (a) in FIG. 6, a3 denotes an area having a relatively low pixel intensity, and a4 denotes an area having a relatively high pixel intensity.

The display device 1000 performs, for example, the contrast control on the input image. The display device 1000 outputs an image having the same pixel intensity as the solid line in (a) in FIG. 6 via the display module 150. Details of the image quality control are the same as or similar to those described in (a) in FIG. 4. Accordingly, the display device 1000 may maximize the contrast of the input image via the contrast control.

(b) in FIG. 6 is a graph in which only the sharpness control is performed on the input image. In (b) in FIG. 6, b3 denotes an area having a relatively low pixel intensity, and b4 denotes an area having a relatively high pixel intensity. In addition, in (b) in FIG. 6, d denotes a spacing between the area b3 having the low pixel intensity and the area b4 having the high pixel intensity. In this regard, the input image has a relatively wide spacing d5 between the area with the low pixel intensity b3 and the area with the high pixel intensity b4.

The display device 1000 performs, for example, the sharpness control on the input image. The display device 1000 outputs an image having the same pixel intensity as the solid line in (b) in FIG. 6 via the display module 150. Details of the image quality control are the same as or similar to those described in (b) in FIG. 4.

Accordingly, the display device 1000 outputs an output image having a relatively narrow spacing d6 between the area b3 having the low pixel intensity and the area b4 having the high pixel intensity via the display module 150. That is, the display device 1000 shortens a transition section of the input image from the area b3 having the low pixel intensity to the area b4 having the high pixel intensity. As described above, the display device 1000 outputs the sharper image by performing the sharpness control on the input image.

However, unlike in (b) in FIG. 4, when the image on which the image quality control has been performed is actually output, side effects may occur in the output image. In this regard, the side effects include any phenomenon in which a result value different from the intended one is output via the image quality control.

For example, overshoot o1 or undershoot u1 may occur in the output image as shown in (b) in FIG. 6. The overshoot o1 or the undershoot u1 is a section in which a spacing between the area b3 having the low pixel intensity area and the area b4 having the high pixel intensity appears greater than an expected range. Accordingly, the output image generates dissonance with pixel intensities distributed in surrounding signals because of the overshoot o1 or the undershoot u1. Alternatively, for example, although not shown, the side effects including ringing may occur in the output image. The ringing is a phenomenon that looks like a wave around a boundary by processing such as various boundary expressions or the like.

As such, when one image quality control is performed on the input image, the display device 1000 may output the image in which the side effect caused by the image quality control is generated.

Figure 7:
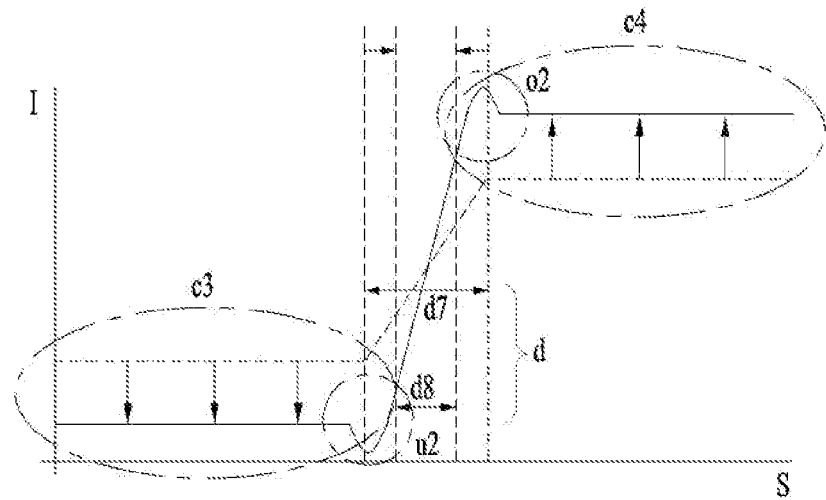
FIG. 7 is a graph illustrating an example of controlling contrast and sharpness together.

FIG. 7 is a graph illustrating an example of controlling contrast and sharpness together.

In FIG. 7, a horizontal axis represents the position S at which the image is output via the display module 150, and a vertical axis represents the pixel intensity I as the brightness of the display module. In addition, in FIG. 7, a dotted line indicates brightness when the image quality control is not performed on the input image, and a solid line indicates brightness when the image quality control is performed on the input image.

FIG. 7 is a graph illustrating an example of simultaneously performing the contrast control described in (a) in FIG. 6 and the sharpness control described in (b) in FIG. 6. In FIG. 7, c3 denotes an area having a relatively low pixel intensity, and c4 denotes an area having a relatively high pixel intensity. In addition, in FIG. 5, d denotes the spacing between the area c1 having the low pixel intensity and the area c2 having the high pixel intensity.

The display device 1000 may perform the plurality of image quality controls on the input image. For example, the display device 1000 simultaneously performs the contrast control and the sharpness control on the input image. The display device 1000 outputs an image having the same pixel intensity as the solid line in FIG. 6 via the display module 150.

For example, the display device 1000 makes a relatively dark portion darker as shown in c3 via the contrast control on the input image. In addition, the display device 1000 makes a relatively bright portion brighter as shown in c4 via the contrast control on the input image. In addition, the display device 1000 makes a spacing between the area c3 having the low pixel intensity and the area c4 having the high pixel intensity relatively narrow (d7 d8) via the sharpness control on the input image.

As such, the display device 1000 may perform the two or more image quality controls on the input image to output the image having all of the two or more image quality control effects. For example, the display device 1000 may output the image with the high contrast and the higher sharpness.

However, the display device 1000 may output a result different from that of each of the image quality control described with reference to FIGS. 4 and 6 by performing the two or more image quality controls. For example, the display device 1000 may obtain the sharpness enhancement effect greater or smaller than expected by simultaneously performing the contrast enhancement and the sharpness enhancement. That is, a spacing d8 in the case in which the two image quality controls are simultaneously performed may be smaller than a spacing d6 in the case in which only the sharpness enhancement control is performed.

As described above, when the two or more image quality controls are performed, an image having a transition section from the area c3 having the low pixel intensity to the area c4 having the high pixel intensity is shorter than expected. Accordingly, as the two or more image quality controls are performed, an image different from a desired result may rather be output.

In addition, when the two or more image quality controls are performed, the side effects such as overshoot o2 or undershoot u2 may occur in the transition section from the area c3 having the low pixel intensity to the area c4 having the high pixel intensity. Such side effects may occur with the same magnitudes, at the same positions, and/or at the same time as the side effects described in (b) in FIG. 6. Alternatively, such side effects may occur with different magnitudes, at different positions, and/or at a different time than the side effects described in (b) in FIG. 6. For example, the overshoot o2 described in FIG. 7 occurs with a magnitude greater than that of the overshoot o1 described in (b) in FIG. 6, and increases the contrast of the output image.

Figure 8:
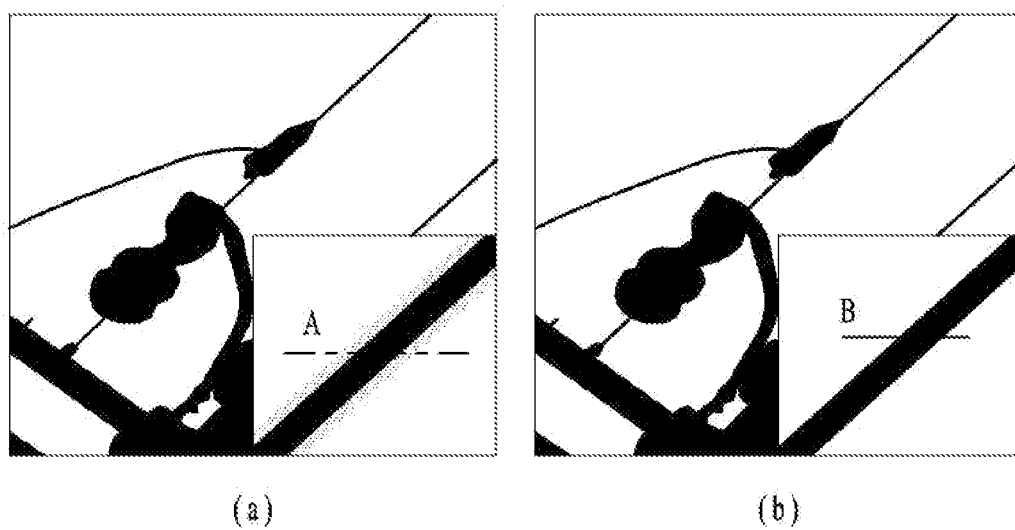
FIG. 8 is a cross-sectional view illustrating an example in which overshoot occurs when contrast and sharpness are controlled together.
Figure 8:
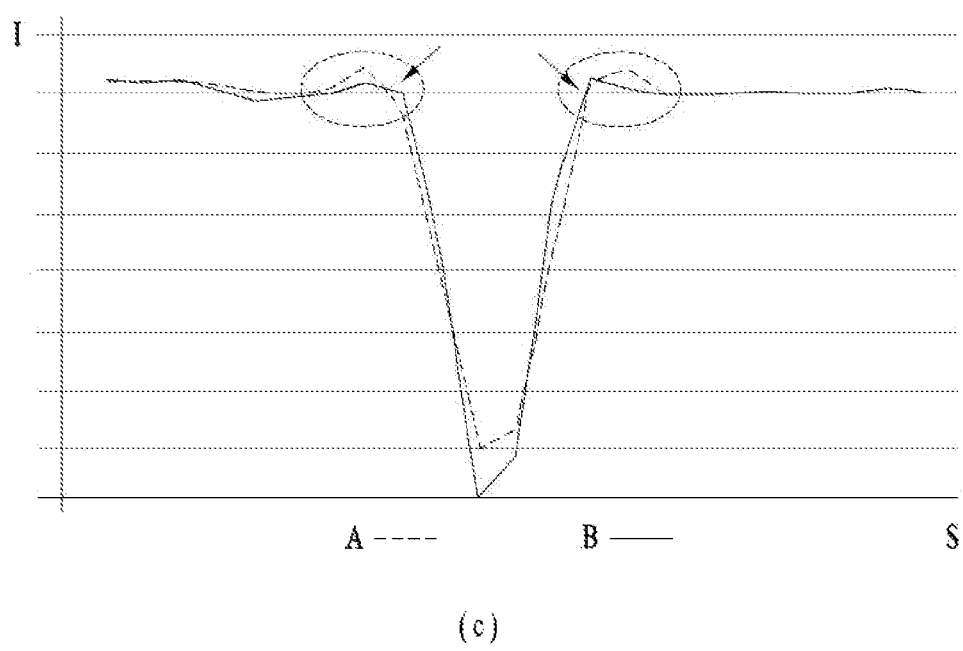

That is, when the two or more image quality controls are performed on the input image, there is a problem in that the magnitude, the occurrence position, and/or the time of the side effect occurring in the image quality control are not able to be further controlled. FIG. 8 is an example of such a case.

FIG. 8 is a cross-sectional view illustrating an example in which overshoot occurs when contrast and sharpness are controlled together.

FIG. 8 illustrates the overshoot as an example of the side effect according to the embodiments of FIGS. 4 to 7.

(a) and (b) in FIG. 8 show examples of images in which the overshoot has occurred. (a) in FIG. 8 is an example of an image in which overshoot of a relatively great magnitude has occurred. In addition, (b) in FIG. 8 is an example of an image in which overshoot of a relatively small size has occurred. As shown in (a) and (b) in FIG. 8, it may be seen that the sharpness of the image is further deteriorated when the overshoot has the relatively great magnitude. For example, it may be seen that there are more white areas between the area having the high pixel intensity and the area having the low pixel intensity of the image signal in (a) in FIG. 8 than in (b) in FIG. 8. That is, when the sharpness is excessively enhanced out of a control range, the image in which the side effect has occurred is rather output.

(c) in FIG. 8 shows a cross-section of each overshoot with respect to each of A of (a) in FIG. 8 and B of (b) in FIG. 8. In (c) in FIG. 8, a dashed-dotted line represents the cross-section of A of (a) in FIG. 8, and a solid line represents the cross-section of B of (b) in FIG. 8. In addition, in (c) in FIG. 8, a horizontal axis represents the position S at which the image is output via the display module 150, and a vertical axis represents the pixel intensity I as the brightness of the display module.

As shown in (c) in FIG. 8, it may be seen that A and B are overshoots occurred at different positions. In addition, it may be seen that A and B are overshoots having different magnitudes. In addition, it may be seen that A and B are overshoots having different occurrence times and/or durations.

As such, there is the problem in that it is difficult to predict or control the position, the magnitude, and the time of the side effect caused by the one or more image quality controls described with reference to FIGS. 4 to 7. Such problem is further increased when the two or more image quality controls are performed. Therefore, hereinafter, a display device and a display control method in which the side effects caused by the image quality control are minimized by solving such problem and the output image on which the image quality control has been performed is within an expected range will be described in detail.

Figure 9:
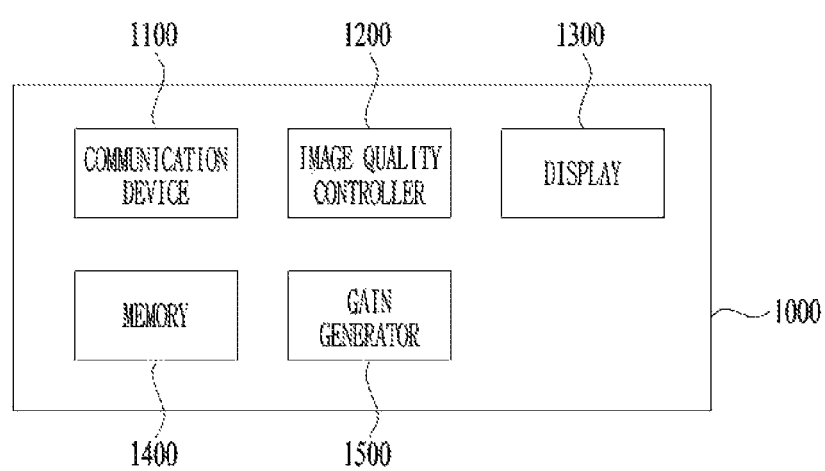
FIG. 9 is a block diagram schematically illustrating a configuration of a display device according to embodiments.

FIG. 9 is a block diagram schematically illustrating a configuration of a display device according to embodiments.

The display device 1000 (e.g., described in FIGS. 1 to 8) includes a communication device 1100 (e.g., the broadcast reception unit described in FIG. 2), an image quality controller 1200, a display 1300 (e.g., including the display module described in FIG. 2), a memory 1400 (e.g., including the storage unit described in FIG. 2), and a gain generator 1500. However, the display device 1000 may include more or fewer components than those listed in FIG. 9.

The communication device 1100 receives the input image (e.g., including 11, 12 and/or 13 described in FIG. 12) from the external device. The input image contains the first frame and the second frame. In this regard, the second frame follows the first frame in time. That is, the second frame is output after a preset time after the first frame is output via the display device 1000.

However, the input image may be, for example, the image pre-stored in the memory 1400 without being received via the communication device 1100. Alternatively, although not shown, the input image may be an image acquired via an image acquisition device built in the display device 1000. In this regard, the image acquisition device is a device for acquiring the image, for example, the camera.

The image quality controller 1200 performs the image quality control on the at least a portion of the input image. As described with reference to FIG. 3, the input image contains the plurality of frames. Each of the plurality of frames contains a plurality of pixels.

The image quality controller 1200 performs the image quality control for each of the plurality of frames. The image quality controller 1200 divides each of the plurality of frames into one or more areas and performs the image quality control for each area. For example, the image quality controller 1200 performs the image quality control by dividing each frame into a plurality of areas including a first area and a second area. In this regard, the image quality controller 1200 may perform different image quality control for the first area and the second area. For example, the image quality controller 1200 may apply a degree of sharpness control performed on the first area and a degree of sharpness control performed on the second area different from each other. In this regard, one area contains one or more pixels. Accordingly, the image quality controller 1200 may perform the image quality control for each individual pixel, or may simultaneously perform the image quality control on the plurality of pixels.

The display 1300 outputs the image and, for example, delivers visual information to a consumer. For example, the display 1300 outputs the input image. Alternatively, the display 1300 outputs the image obtained as the image quality control is performed on the input image. In this regard, the image quality control performed on the input image includes image quality control in which 100% of image quality control required for the input image is performed. Alternatively, the image quality control may be image quality control in which a portion of the image quality control required for the input image is performed, and include, for example, image quality control in which 50% of image quality control is performed.

The memory 1400 stores the pre-stored input image as described above. The memory 1400 stores the received or acquired input image. The memory 1400 stores the input image on which the image quality control has been performed. The memory 1400 stores data necessary to perform the image quality control on the input image. For example, the memory 1400 stores information on pixels contained in each of one or more frames contained in the input image. The information on the pixels includes, for example, a pixel intensity (e.g., the pixel intensity described with reference to FIGS. 4 to 8). In addition, for example, the memory 1400 stores data necessary for the gain generator 1500 to calculate a gain and the gain calculated by the gain generator 1500.

The gain generator 1500 calculates a gain required for the image quality control on the input image. The gain generator 1500 calculates a gain for adaptive control of a transfer function.

In this regard, the gain is a compensation value for removing or minimizing the side effects described in FIGS. 4 to 8 during the image quality control. That is, the gain is a value necessary to compensate the output of the unexpected result value resulted from the one or more image quality controls and to output the image based on the intended image quality control. For example, the gain generator 1500 calculates a gain of the second frame based on the first frame on which first image quality control has been performed. Accordingly, the gain generator 1500 allows image quality control with no or minimized side effects described with reference to FIGS. 4 to 7 to be performed on the second frame.

Hereinafter, characteristics of controlling the image output from the display device 1000 using the display device 1000 will be described in more detail.

Figure 10:
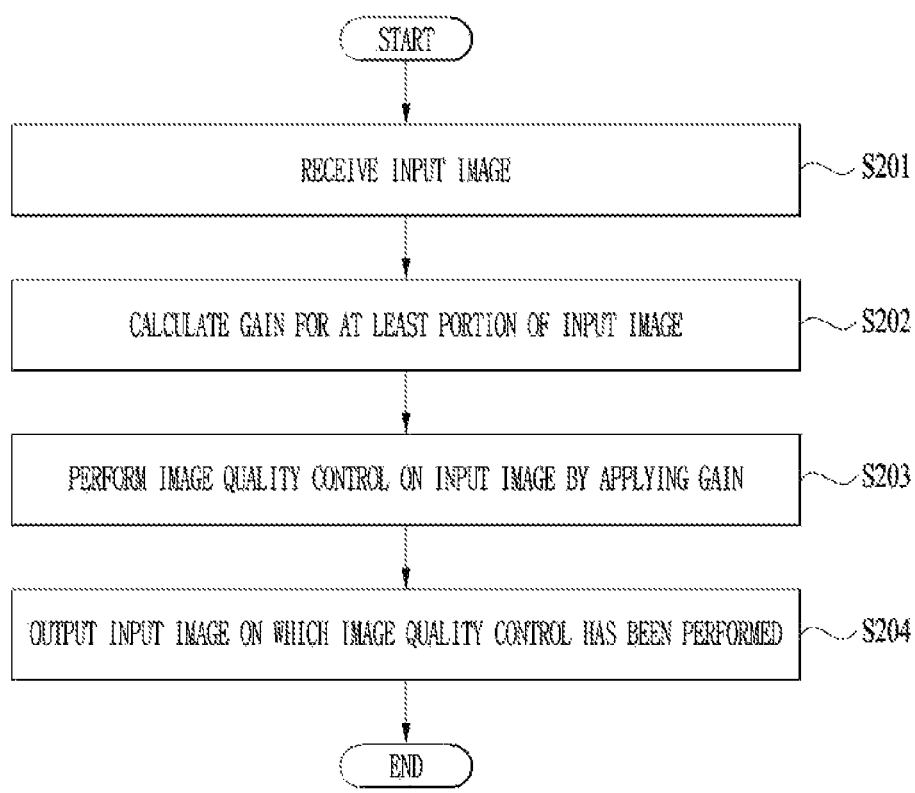
FIG. 10 is a flowchart illustrating a method for controlling a display device according to embodiments.

FIG. 10 is a flowchart illustrating a method for controlling a display device according to embodiments.

As shown in FIG. 10, the method for controlling the display by the display device 1000 includes receiving the input image (s201).

The display device 1000 receives the input image via the communication device 1100. Alternatively, the display device 1000 may call the input image stored in the memory 1400. Alternatively, the display device 1000 may acquire the input image via the image acquisition device such as the camera, for example.

In this regard, the input image contains the plurality of frames. For example, the input image contains the first frame (e.g., 11 described in FIG. 12) and the second frame (e.g., 12 described in FIG. 12). In this regard, the second frame follows the first frame in time. That is, the display device 1000 outputs the first frame and then outputs the second frame. A description of the input image is the same as or similar to that made with reference to FIG. 3.

The method for controlling the display by the display device 1000 includes calculating a gain for the at least a portion of the input image (s202).

The gain generator 1500 calculates the gain for the input image. The gain generator 1500 calculates the gain of each of the plurality of frames contained in the input image. For example, the gain generator 1500 calculates a gain applied to the second frame based on the image quality control on the first frame. As such, the gain generator 1500 calculates the gain for the input image, so that the image quality controller 1200 may perform the image quality control without the side effects in the input image. In addition, embodiments calculate a gain applied to a current frame from a previous frame (e.g., a frame one frame before the current frame) to calculate an appropriate gain without a delay of frame output. In this regard, as described above, the gain may be calculated for each pixel contained in each frame.

The method for controlling the display by the display device 1000 includes performing the image quality control on the input image by applying the gain (s203).

The image quality controller 1200 performs appropriate image quality control on the input image based on the gain calculated by the gain generator 1500.

The image quality controller 1200 performs the image quality control by calculating an output value of the output image with respect to an input value of the input image. In this regard, the input value of the input image is pixel data for the at least a portion of the input image. For example, the input value of the input image is data of a pixel contained in a partial area of the first frame contained in the input image, and is, for example, an input intensity of the input image. In addition, the output value of the output image is data of the pixel on which the image quality control has been performed. For example, the output value of the output image is data of a pixel contained in a partial area of the first frame contained in the output image, and is, for example, an output intensity of the output image. In this regard, the partial area of the first frame contained in the input image and the partial area of the first frame contained in the output image correspond to each other. That is, the partial area of the first frame contained in the output image is an area where the image quality control is performed on the partial area of the first frame contained in the input image.

The image quality control performed by the image quality controller 1200 includes the contrast control and/or the sharpness control. In addition, the image quality control may further include resolution control and/or gradation control. The image quality controller 1200 may perform the two or more image quality controls on the input image, and, for example, may simultaneously perform the contrast control and the sharpness control. As such, the embodiments generate an image on which the image quality control has been performed without the side effects by performing the one or more image quality controls to which the gain is applied on the input image.

The image quality controller 1200 controls the image quality additionally in consideration of an additional factor such that the image quality control is performed without any side effects on the input image. In this regard, the additional factor is a value that changes depending on the input image. The additional factor is, for example, average brightness of the input image. The image quality controller 1200 performs the image quality control based on such additional factor.

The method for controlling the display by the display device 1000 includes outputting the input image on which the image quality control has been performed (s204).

The display device 1000 outputs the input image on which the image quality control has been performed via the display 1300. Alternatively, the display device 1000 outputs the input image on which the image quality control has been performed via the external device connected to the display device 1000 in the wired or wireless manner. The display device 1000 sequentially outputs the plurality of frames contained in the input image. That is, the display device 1000 outputs the first frame and then outputs the second frame on which the image quality control has been performed. Alternatively, the display device 1000 outputs the first frame on which the image quality control has been performed and then outputs the second frame on which the image quality control has been performed.

As such, the display device 1000 may output the image quality-controlled-image with no or minimized side effects even when one or a plurality of image quality controls are performed on the input image. For example, when the sharpness control (e.g., the sharpness enhancement) is performed on the input image, the display device 1000 may prevent or minimize the side effects such as the overshoot or the undershoot. In addition, the display device 1000 may also prevent or minimize the side effects such as the overshoot or the undershoot even when the contrast control (e.g., the contrast enhancement) and the sharpness control (e.g., the sharpness enhancement) are performed together with respect to the input image.

Hereinafter, the methods (s202 to s203) for calculating the gain and performing the image quality control will be described in more detail.

Figure 11:
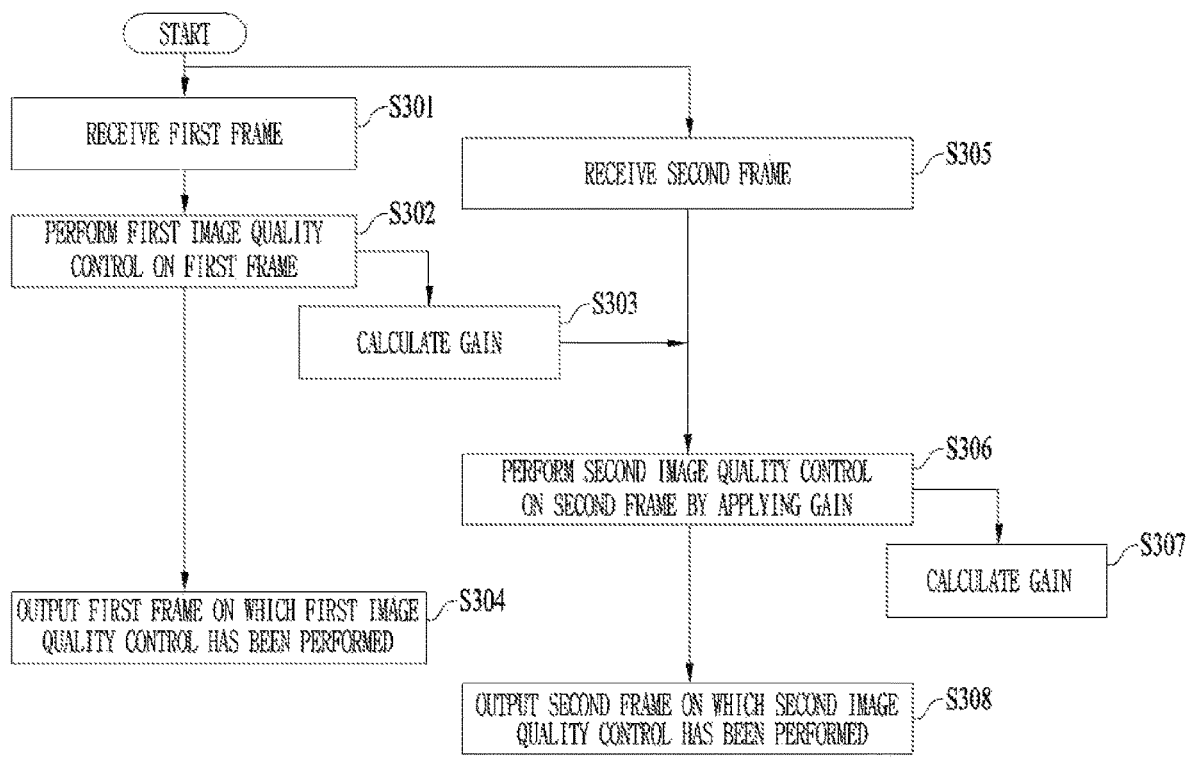
FIG. 11 is a flowchart illustrating a method for controlling a display device according to embodiments.
Figure 12:
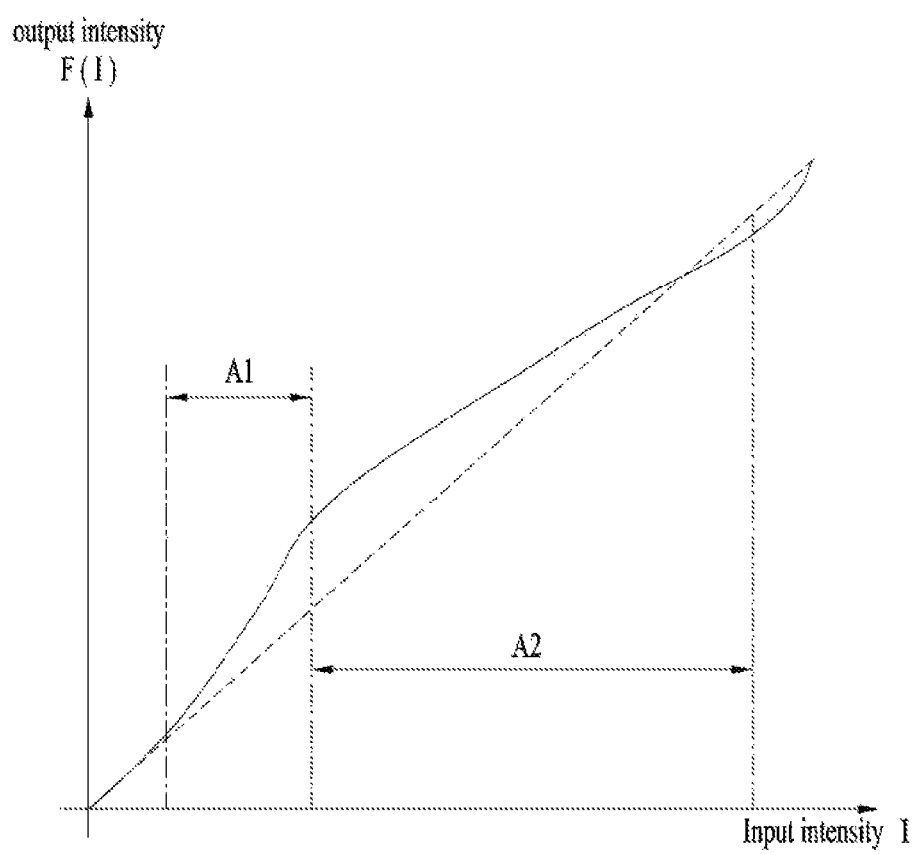
FIG. 12 is an input value-output value graph based on image quality control according to embodiments.
Figure 13:
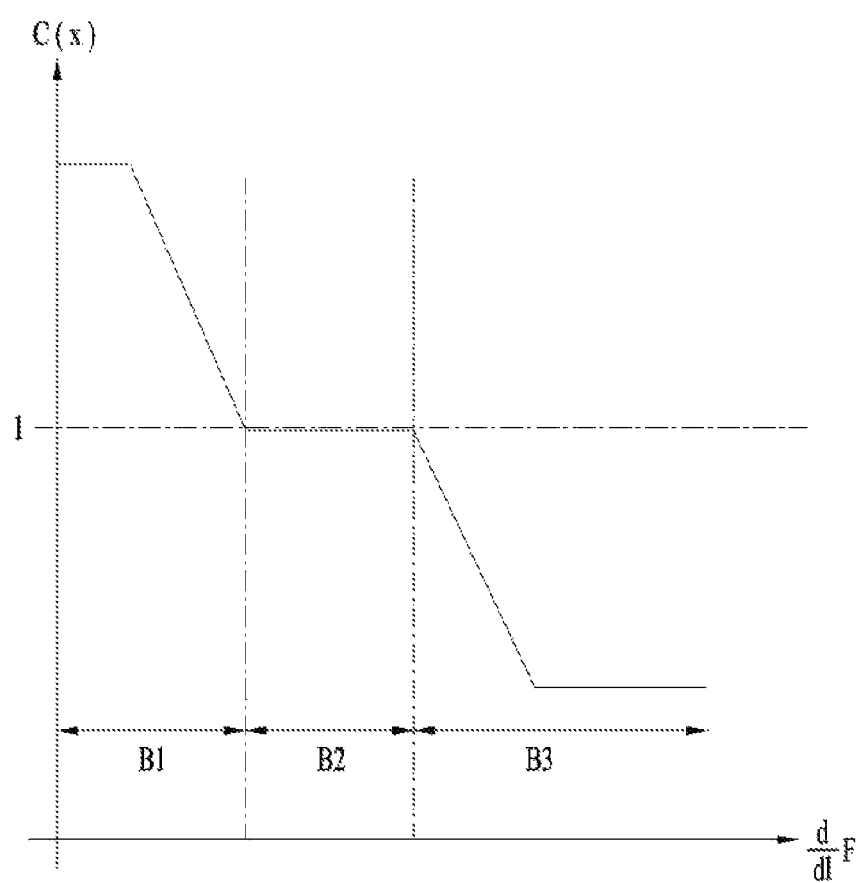
FIG. 13 is a gradient-gain graph based on image quality control according to embodiments.

In FIGS. 11 to 13 below, for convenience of description, an example in which embodiments perform the plurality of image quality controls on the input image will be described. For example, the embodiments perform the contrast control and the sharpness control on the input image.

FIG. 11 is a flowchart illustrating a method for controlling a display device according to embodiments.

The method for controlling the display by the display device 1000 includes receiving the first frame (s301).

The first frame (e.g., 11 described in FIG. 12) is contained in the input image described in s101 of FIG. 3 or s201 of FIG. 10. The display device 1000 receives the first frame via the communication device 1100. A description of s301 is the same as or similar to the content described above in s101 or s201.

The method for controlling the display by the display device 1000 includes performing the first image quality control on the first frame (s302). A description of the first image quality control includes all or a portion of the description of the image quality control made with reference to FIGS. 3 to 10. For example, the first image quality control includes the image quality control that performs the contrast control and the sharpness control together.

The image quality controller 1200 performs the first image quality control on the first frame. For example, the image quality controller 1200 performs the first image quality control via [Mathematical Equation 1] below.

$$U1(x) = x + x * h \quad \text{[Mathematical Equation 1]}$$

Here, U1(x) represents an output frame as the first frame on which the first image quality control has been performed. For example, U1(x) is an output frame containing output values for respective areas or pixels. For example, U1(x) when contains an output value for an arbitrary pixel, as described above with reference to FIGS. 3 to 10, the output value is an output intensity of the corresponding arbitrary pixel, and is brightness of the corresponding pixel in the output image on which the first image quality control has been performed. In this regard, the output value includes data for the control of the image quality such as the contrast and the sharpness, as described above.

x represents the first frame, and, for example, is the input frame containing the input values of the respective areas or pixels contained in the first frame. For example, when x is an input value for an arbitrary pixel, as described above with reference to FIGS. 3 to 10, the input value is an input intensity of the corresponding arbitrary pixel, and is brightness of the corresponding pixel in the first frame. In this regard, the input value contains data on the contrast, the sharpness, and the like of the corresponding pixel before the first image quality control is performed, as described above.

h is an image quality control filter for the first image quality control. For example, h is the high-pass filter (HPF), and is a filter that passes only frequency signals within a specific frequency range. For example, the high-pass filter passes only frequency components higher than a specific frequency and blocks most of frequency components lower than the specific frequency. In this regard, the specific frequency is a preset value.

* is a convolution. That is, the embodiments generate a high frequency for the image quality control via x*h. For example, when performing the sharpness enhancement control, the embodiments generate the high frequency for the sharpness enhancement control via x*h.

The first image quality control performs the image quality control on the plurality of pixels contained in the first frame. The image quality controller 1200, for example, performs different image quality controls on the first area and the second area contained in the first frame. The different image quality controls are different from each other in a type of the image quality control or a degree of the image quality control. For example, the image quality controller 1200 performs the contrast control of 50 on the first area and the contrast control of 51 on the second area, thereby performing the image quality controls with the different degrees on the respective areas.

In this regard, each of one or more areas contained in the first frame contains one or more pixels. That is, the image quality controller 1200 may perform the image quality control for each pixel contained in the first frame.

The method for controlling the display by the display device 1000 includes calculating the gain based on s302 (s303).

The gain generator 1500 calculates the gain based on the first frame on which the first image quality control has been performed. The gain generator 1500 calculates the gain via a transfer function based on the first frame on which the first image quality control has been performed. For example, when the contrast control and the sharpness control are performed as the first image quality control, the gain generator 1500 calculates the gain based on a differential value of a contrast transfer function. That is, the gain generator 1500 generates the gain for obtaining an adaptive sharpness enhancement effect for the contrast transfer function. Therefore, the gain is a value for correcting the sharpness enhancement effect based on the contrast enhancement effect. The gain is calculated via [Mathematical Equation 2] below.

$$\text{gain} = C\left(\frac{d}{dI}F\right) \quad \text{[Mathematical Equation 2]}$$

Here, C represents a characteristic function as a function of the gain. The characteristic function C includes a form of a must be mono-deceasing function.

F represents a transfer function for each image quality control, and represents, for example, a contrast transfer function performed by the first image quality control. The contrast transfer function is an input/output transfer function determined to apply the contrast control on the input image, and is, for example, a preset function. In this regard, the transfer function may receive the additional factor from the image quality controller 1200 and further consider the content thereof. For example, the contrast transfer function is set by further considering the value of the average brightness of the input image as the additional factor.

The gain is calculated based on a value obtained by differentiating the contrast transfer function F described in s302 by the input intensity.

For example, a high differential value of the contrast transfer function F means a greater effect of the contrast control at the corresponding input intensity. Accordingly, the gain generator 1500 decreases the gain when the differential value of the contrast transfer function exceeds a preset value.

In addition, for example, a low differential value of the contrast transfer function F means a smaller effect of the contrast control at the corresponding input intensity. Accordingly, the gain generator 1500 increases the gain when the differential value of the contrast transfer function is lower than the preset value.

In one example, the differential value of the contrast transfer function F being the preset value means that the effects of the contrast control and the sharpness control at the corresponding input intensity are the same as or similar to each other. Accordingly, the gain generator 1500 preserves the gain when the differential value of the contrast transfer function is the preset value. In this case, for example, the gain is 1.

The embodiments calculate the gain based on the differential value of the transfer function. Accordingly, for example, when the two or more image quality controls are performed, the embodiments may lower dependency between the effects of the respective two or more image quality controls. For example, when the first image quality control includes the contrast control and the sharpness control, the transfer function is the contrast transfer function. By calculating and applying the gain based on the contrast transfer function, the embodiments may lower the dependency between the contrast enhancement effect based on the contrast control and the sharpness enhancement effect based on the sharpness control.

In one example, the gain generator 1500 calculates a gain value applicable to the image quality control.

For example, the gain corresponds to the first image quality control performed by the image quality controller 1200 in s302. For example, the gain generator 1500 calculates a gain including a value for the sharpness as a value applicable to the first image quality control. For example, the gain generator 1500 calculates a gain for the sharpness control in response to the effect of the contrast control. Accordingly, the embodiments ensure that no side effects occur in the output image even when the contrast control and the sharpness control are performed at the same time.

However, the gain may include, for example, a value for the image quality control not performed in the first image quality control. For example, even when the first image quality control includes the contrast control and the sharpness control, the gain may include at least one of the contrast, the sharpness, the brightness, and a color depth.

The gain generator 1500 may calculate the gain for each pixel contained in the first frame on which the first image quality control has been performed. In this regard, the gain generator 1500 calculates the gain for each of the one or more pixels. Accordingly, the display device 1000 may include the gain generators 1500 of the number corresponding to the number of pixels contained in the first frame or lower than the number of pixels.

The method for controlling the display by the display device 1000 includes outputting the first frame on which the first image quality control has been performed (s304).

The display 1300 outputs the first frame on which the first image quality control has been performed. In this regard, when the first frame is the most preceding frame in the entire input image, the image quality controller 1200 performs the first image quality control on the first frame without calculating or applying the gain described in s202 to s203 in FIG. 10. Accordingly, in this case, the display 1300 outputs the first frame on which the first image quality control has been performed without calculating or applying the gain.

However, unlike described in s301 to s304, the image quality controller 1200 may perform the image quality control to which the gain is applied even for the most preceding frame. In this case, the image quality controller 1200 performs the image quality control on the most preceding frame. The gain generator 1500 calculates the gain based on the performed image quality control. The image quality controller 1200 re-performs the image quality control for the most preceding frame by applying the calculated gain. The display 1300 outputs the frame on which the image quality control is performed as such. Using such method, the embodiments may perform the image quality control without the side effects on all frames output by the display device 1000.

The method for controlling the display by the display device 1000 includes receiving the second frame (s305). s305 may be performed simultaneously with s301 or may be performed sequentially. That is, the second frame (e.g., 12 described in FIG. 12) follows the first frame in time.

The second frame is contained in the input image described in s101 in FIG. 3 or s201 in FIG. 10. The display device 1000 receives the second frame via the communication device 1100. A description of s305 is the same as or similar to the content described above in s101 or s201.

The method for controlling the display by the display device 1000 includes performing the second image quality control on the second frame by applying the gain (s306). For example, the second image quality control includes the image quality control that performs the contrast control and the sharpness control together like the first image quality control.

The image quality controller 1200 performs the second image quality control on the second frame. For example, the image quality controller 1200 performs the second image quality control via [Mathematical Equation 3] below.

$$U2(x) = x + x^* h \times g \quad \text{[Mathematical Equation 3]}$$

Here, U2(x) represents the output frame as the second frame on which the second image quality control has been performed. For example, U2(x) is an output frame containing output values for respective areas or pixels. For example, when U2(x) contains an output value for an arbitrary pixel, as described above with reference to FIGS. 3 to 10, the output value is an output intensity of the corresponding arbitrary pixel, and is brightness of the corresponding pixel in the output image on which the second image quality control has been performed. In this regard, the output value includes data for the control of the image quality such as the contrast and the sharpness, as described above.

x represents the second frame, and, for example, is the input frame containing the input values of the respective areas or pixels contained in the second frame. For example, when x is an input value for an arbitrary pixel, as described above with reference to FIGS. 3 to 10, the input value is an input intensity of the corresponding arbitrary pixel, and is brightness of the corresponding pixel in the second frame. In this regard, the input value contains data on the contrast, the sharpness, and the like of the corresponding pixel before the second image quality control is performed, as described above.

h is an image quality control filter for the second image quality control. For example, h is the high-pass filter. For example, the high-pass filter passes only frequency components higher than a specific frequency and blocks most of frequency components lower than the specific frequency. In this regard, the specific frequency is a preset value.

g is the gain. The gain is the gain calculated by [Mathematical Equation 2] in s303.

* is the convolution. That is, the embodiments generate the high frequency for the image quality control via x*h. For example, when performing the sharpness enhancement control, the embodiments generate the high frequency for the sharpness enhancement control via x*h.

× is a multiplication. That is, the embodiments apply the gain to the second frame by further multiplying the gain g to x*h.

As such, the embodiments perform the calculation for the second image quality control applied to the second frame based on the data for the first frame on which the first image quality control has been performed. That is, the embodiments perform the second image quality control by applying the gain calculated from the first frame on which the first image quality control has been performed.

The second image quality control includes image quality control for a plurality of pixels contained in the second frame. The image quality controller 1200, for example, performs different image quality controls on a first area and a second area contained in the second frame. The different image quality controls are different from each other in a type of the image quality control or a degree of the image quality control. For example, the image quality controller 1200 performs the contrast control of 50 on the first area and the contrast control of 51 on the second area, thereby performing the image quality controls with the different degrees on the respective areas.

In this regard, each of one or more areas contained in the second frame contains one or more pixels. That is, the image quality controller 1200 may perform the image quality control for each pixel contained in the second frame.

In this regard, the area where the first image quality control was performed in the first frame and the area where the second image quality control was performed in the second frame correspond to each other. That is, such two areas are output to positions corresponding to each other on the display.

In one example, for example, when the gain includes at least one of the contrast, the sharpness, the brightness, and the color depth, the image quality controller 1200 allows the second image quality control to include at least one of the contrast, the sharpness, the brightness, and the color depth corresponding to such gain. For example, when the gain calculated in s303 includes the color depth, the image quality controller 1200 allows the second image quality control to include the image quality control for the color depth.

The method for controlling the display by the display device 1000 includes calculating the gain based on s306 (s307).

The gain generator 1500 calculates the gain based on the second frame on which the second image quality control has been performed. The gain generator 1500 calculates the gain by [Mathematical Equation 4] below.

$$\text{gain} = C\left(\frac{d}{dI}F\right) \qquad \text{[Mathematical Equation 4]}$$

Here, C represents the characteristic function as the function of the gain. In addition, F represents the transfer function for each image quality control, and, for example, represents the contrast transfer function performed by the first image quality control. The gain is calculated based on the value obtained by differentiating the contrast transfer function F described in s306 by an input intensity I. Using the above, the embodiments calculate the gain based on the differential value of the transfer function. A description of s306 is the same as or similar to the description of s303.

The method for controlling the display by the display device 1000 includes outputting the second frame on which the second image quality control has been performed (s308). A description of the second image quality control includes all or a portion of the description of the image quality control made with reference to FIGS. 3 to 10.

Therefore, the display device 1000 according to the embodiments provides two or more image quality controls with low dependency on each other. That is, the embodiments provide the output image with little or no side effects while providing the two or more image quality controls. For example, when the sharpness control (e.g., the sharpness enhancement) is performed on the input image, the display device 1000 may prevent or minimize the side effects such as the overshoot or the undershoot. In addition, even when the contrast control (e.g., the contrast enhance) and the sharpness control (e.g., the sharpness enhance) are performed together on the input image, the display device 1000 may prevent or minimize the side effects such as the overshoot or the undershoot.

Hereinafter, the contents described with reference to FIGS. 1 to 11 will be described in more detail using graphs.

FIG. 12 is an input value-output value graph based on image quality control according to embodiments.

FIG. 13 is a gradient-gain graph based on image quality control according to embodiments.

In FIG. 12, a horizontal axis is the input intensity I of the pixel, which is the brightness of the input image. In this regard, the input intensity I is the input intensity described with reference to FIG. 11. A vertical axis is an output intensity F(I) of the pixel, which is brightness of the output image. In this regard, the output intensity F(I) is the transfer function described with reference to FIG. 11, and is, for example, the contrast transfer function. That is, FIG. 12 shows the contrast transfer function F based on the input intensity I.

In FIG. 13, a horizontal axis is a gradient of F(I) in FIG. 12, and is a differential value of the transfer function F(I). In this regard, the transfer function F(I) is, for example, the contrast transfer function described with reference to FIG. 11. In FIG. 13, a vertical axis is the gain. For example, the vertical axis in FIG. 13 is the gain for the sharpness control. That is, the vertical axis in FIG. 13 is the characteristic function C for obtaining the gain described in FIG. 11. FIG. 13 shows the gain based on the differential value of the transfer function F(I).

In FIG. 12, A1 represents an area in which a gradient exceeds a preset value. In this regard, the gradient is the gradient of the contrast transfer function F(I), and is a value obtained by differentiating the contrast transfer function F(I). In addition, the preset value is, for example, a value with the same input intensity I and output intensity F(I), which is 1.

A1 is an area where the differential value of the contrast transfer function F described with reference to FIG. 11 is great. A1 is an area with a great contrast enhancement effect at the corresponding brightness. That is, A1 is an area where the brightness of the pixel is higher than expected as the contrast control and the sharpness control are simultaneously performed. A1 is, for example, an area in which the overshoot o2 described in FIG. 7 has occurred.

The gain generator 1500 calculates a gain that suppresses the sharpness control effect in order to lower the differential value. That is, the gain generator 1500 reduces the gain applied to the sharpness control effect. Therefore, the image quality controller 1200 performs image quality control with the reduced sharpness enhancement effect by applying the reduced gain.

B3 in FIG. 13 corresponds to A1 in FIG. 12. That is, B2 is an area that suppresses the sharpness control effect.

In addition, in FIG. 12, A2 represents an area in which the gradient is lower than the preset value.

A2 is an area in which the differential value of the contrast transfer function F described with reference to FIG. 11 is low. A2 is an area with a small contrast enhancement effect at the corresponding brightness. That is, A2 is an area in which the brightness of the pixel is lower than expected as the contrast control and the sharpness control are simultaneously performed. A2 is, for example, an area in which the undershoot u2 described with reference to FIG. 7 has occurred.

The gain generator 1500 calculates a gain that increases the sharpness control effect in order to increase the differential value. That is, the gain generator 1500 increases the gain applied to the sharpness control effect. Therefore, the image quality controller 1200 performs image quality control with the increased sharpness enhance effect by applying the increased gain.

B1 in FIG. 13 corresponds to A2 in FIG. 12. That is, B1 is an area that enhances the sharpness control effect.

B2 in FIG. 13 represents an area in which the gradient is the preset value in FIG. 12. In this case, the gain is preserved (maintained). In one example, B2 in FIG. 13 may be applied to the area in FIG. 12 in which the gradient is lower than the preset value. That is, even when no separate sharpness control is performed, the gain is preserved in a range in which the sharpness control effect based on the contrast control occurs. In this regard, the range in which the sharpness control effect based on the contrast control occurs is a range that includes an expected sharpness control effect value when only the sharpness control is performed.

As described above, the display device 1000 according to the embodiments calculates the gain for the sharpness control based on the differentiation of the contrast transfer function. Therefore, the display device 1000 reduces the dependency between the contrast control effect and the sharpness control effect. In addition, even when the two or more image quality controls are performed, the display device 1000 may minimize the side effects that occur more greatly while performing the two or more image quality controls.

An embodiment for performing the image quality control will be described with reference to FIGS. 14 to 15 below.

Figure 14:
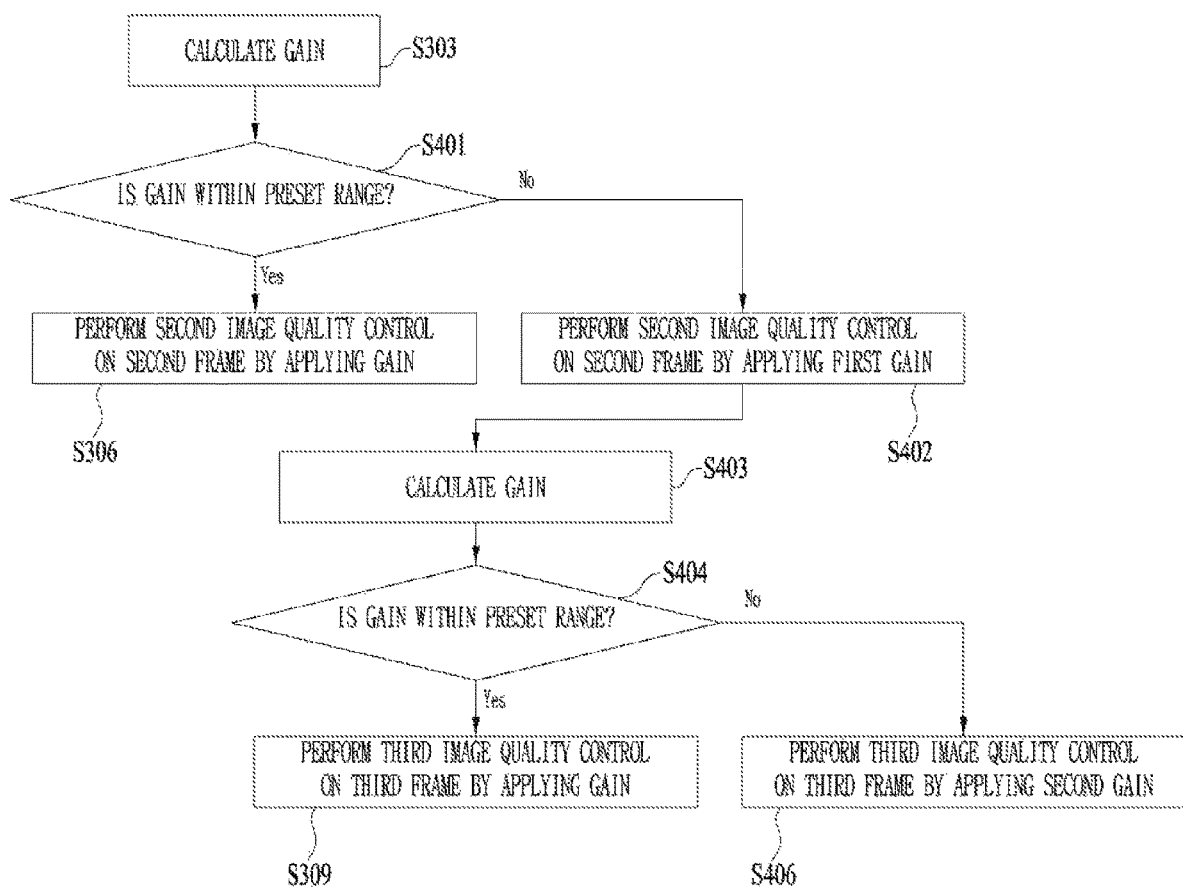
FIG. 14 is a flowchart illustrating a method for controlling a display device according to embodiments.

FIG. 14 is a flowchart illustrating a method for controlling a display device according to embodiments.

Figure 15:
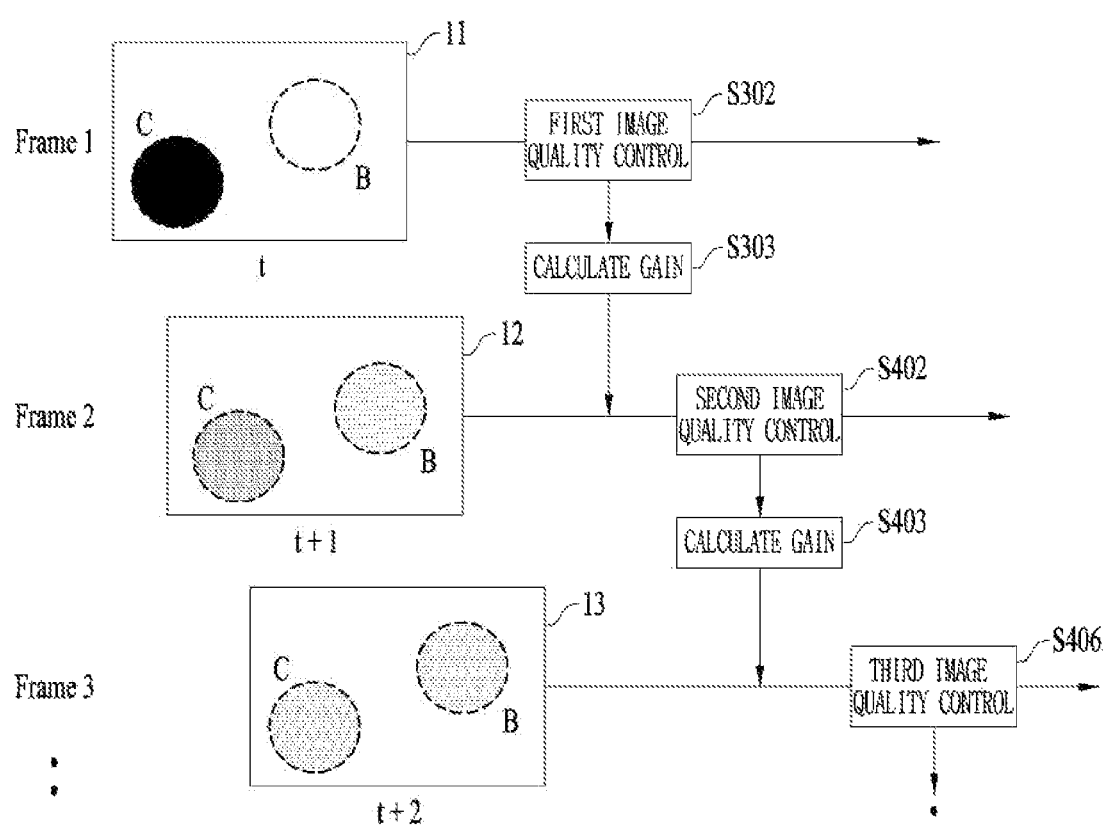
FIG. 15 is a diagram for illustrating a method for controlling a display device according to embodiments.

FIG. 15 is a diagram for illustrating a method for controlling a display device according to embodiments.

FIG. 14 illustrates an example of performing the image quality control based on the calculated gain in FIG. 11.

In FIG. 15, 11 represents the first frame, 12 represents the second frame, and 13 represents a third frame. In this regard, the first frame 11 precedes the second frame 12 in time, and the second frame 12 precedes the third frame 13 in time. That is, the display device 1000 outputs the second frame 12 after outputting the first frame 11, and outputs the third frame 13 after outputting the second frame 12.

In addition, in FIG. 12, B represents the first area of the input image, and C represents the second area of the input image.

The method for controlling the display device includes calculating the gain (s303). A description of s303 is the same as or similar to the description of s303 made with respect to FIG. 11.

The method for controlling the display device includes determining whether the gain is within a preset range (s401).

The method for controlling the display device includes performing the second image quality control on the second frame 12 by applying the gain when the gain is within the preset range (s306). A description of s306 is the same as or similar to the description of s306 made with reference to FIG. 11. The second frame 12 on which the second image quality control has been performed by s306 is output via the display 1300 as in s308 described with reference to FIG. 11.

In one example, the method for controlling the display device includes performing the second image quality control on the second frame 12 by applying a first gain when the gain is not within the preset range (s402).

In this regard, the first gain is a value equal to a predetermined ratio of the gain. For example, the first gain is 30% of the required gain. As such, when the gain is required to exceed the preset range, the image quality controller 1200 applies only a partial ratio of the corresponding gain to the image quality control. Therefore, the embodiments prevent the output image from being changed abruptly when the second frame is output after the first frame is output. That is, the embodiments provide a user with an image from which a gradual change may be felt as the image quality control is performed smoothly.

Although not shown, the second frame 12 on which the second image quality control has been performed by applying the first gain is output via the display 1300 as in s308 described with reference to FIG. 11.

The method for controlling the display device includes calculating the gain (s403). The gain calculator 1500 calculates the gain based on s306 or s402.

The method for controlling the display device includes determining whether the gain is within the preset range (s404).

The method for controlling the display device includes performing third image quality control on the third frame 13 by applying the gain when the gain is within the preset range (s309).

On the other hand, the method for controlling the display device includes performing the third image quality control on the third frame 13 by applying a second gain when the gain is not within the preset range (s406).

In this regard, the second gain is a value corresponding to a predetermined ratio of the gain. For example, the second gain is 30% of the required gain. That is, the embodiments allow the required gain to be closer to the required gain gradually via the second image quality control (s402) and the third image quality control (s406). That is, from the first gain to the second gain, the gain gradually approaches the required gain.

As such, the display device 1000 according to the embodiments applies the gain that gradually varies toward the first frame 11, the second frame 12, and the third frame 13.

In one example, as described above, the display device 1000 locally applies such gain. For example, as shown in FIG. 15, the image quality controller 1200 applies different gains to the first area B and the second area C. For example, the image quality controller 1200 controls brightness of the first area B to gradually increase from the first frame 11 to the third frame 13. That is, the image quality controller 1200 controls a pixel intensity of the first area B to gradually increase from the first frame 11 to the third frame 13. In addition, for example, the image quality controller 1200 controls brightness of the second area C to gradually decrease from the first frame 11 to the third frame 13. That is, the image quality controller 1200 controls a pixel intensity of the second area C to gradually decrease from the first frame 11 to the third frame 13.

Therefore, the display device 1000 according to the embodiments outputs an image in which appropriate image quality control is gradually performed for each area of the screen. The embodiments may allow the user to encounter a more natural image.

Hereinabove, the display device and the method for controlling the display device according to the embodiments of the present invention have been described with the specific embodiments, but this is merely an example, and the present disclosure is not limited thereto. The present disclosure should be construed as having the widest scope based on the basic idea disclosed herein.

A person skilled in the art may practice unspecified embodiments by combining or substituting the disclosed embodiments, without departing from the scope of the present disclosure. It will be apparent to those skilled in the art that various modifications and variations can be made in the present disclosure without departing from the spirit or scope of the invention. Thus, it is intended that the present disclosure cover the modifications and variations of this invention provided they come within the scope of the appended claims and their equivalents.

What is claimed is:

1. A display device comprising:
a communication device configured to receive an input image having a first frame and a second frame, wherein the second frame follows the first frame in time;
at least one processor configured to:
perform a first image quality control on at least a portion of the first frame, the first image quality control including a first sharpness control and a first contrast control;
determine a gain of the second frame based on the at least a portion of the first frame on which the first image quality control has been performed;
perform a second image quality control applied with the gain on at least a portion of the second frame, the second image quality control including a second sharpness control and a second contrast control;
determine the gain such that the second sharpness control is suppressed based on a contrast control effect based on the first contrast control being greater than a preset value for the at least a portion of the first frame;
determine the gain such that the second sharpness control is preserved based on the contrast control effect being equal to the preset value for the at least a portion of the first frame; and
determine the gain such that the second sharpness control is increased based on the contrast control effect being smaller than the preset value for the at least a portion of the first frame.

2. The display device of claim 1, wherein the at least one processor is further configured to perform the second image quality control including the second sharpness control and the second contrast control calculated based on a transfer function.

3. The display device of claim 1, wherein the at least one processor is further configured to perform the second image quality control based on $U(x)=x+x*h \times g$ wherein $U(x)$ denotes the second frame on which the second image quality control has been performed, x denotes the second frame, h denotes an image quality control filter, and g denotes the gain.

4. The display device of claim 1, wherein the at least one processor is further configured to detect an average brightness of the input image and perform the first image quality control based on the average brightness.

5. The display device of claim 1, wherein the input image further has a third frame following the second frame in time,
wherein the at least one processor is further configured to perform the second image quality control by applying a first gain to the second frame and applying a second gain to the third frame when the determined gain is out of a preset range,
wherein the gain gradually comes out of the preset range from the first gain to the second gain.

6. The display device of claim 1, wherein the at least one processor is further configured to perform the first image quality control for each pixel in the first frame.

7. The display device of claim 6, wherein the at least one processor comprises gain generators of a number corresponding to a number of one or more pixels in the first frame.

8. The display device of claim 1, wherein the gain as a value applicable to the first image quality control is a value for at least one of contrast, brightness, color depth, or resolution.

9. A method for controlling a display, the method comprising:
receiving, by a communication device, an input image having a first frame and a second frame, wherein the second frame follows the first frame in time;
performing, by at least one processor, a first image quality control on at least a portion of the first frame, the first image quality control including a first sharpness control and a first contrast control;

determining, by the at least one processor, a gain of the second frame based on the at least a portion of the first frame on which the first image quality control has been performed; and performing, by the at least one processor, a second image quality control on at least a portion of the second frame by applying the gain, the second image quality control including a second sharpness control and a second contrast control;

wherein determining the gain comprises:

determining the gain such that the second sharpness control is suppressed based on a contrast control effect based on the first contrast control being greater than a preset value for the at least a portion of the first frame;

determining the gain such that the second sharpness control is preserved based on the contrast control effect being equal to the preset value for the at least a portion of the first frame; and determining the gain such that the second sharpness control is increased based on the contrast control effect being smaller than the preset value for the at least a portion of the first frame.

10. The method of claim 9, wherein the input image further has a third frame following the second frame in time, wherein performing the second image quality control includes:

when the gain determined based on the first frame is out of a preset range, performing the second image quality control by applying a first gain to the second frame and applying a second gain to the third frame, wherein the gain gradually comes out of the preset range from the first gain to the second gain.

* * * * *